(12) United States Patent
Kumar et al.

(10) Patent No.: US 10,141,123 B2
(45) Date of Patent: Nov. 27, 2018

(54) NANOFIBERS ELECTRODE AND SUPERCAPACITORS

(71) Applicant: Nanyang Technological University, Singapore (SG)

(72) Inventors: Vipin Kumar, Singapore (GB); Pooi See Lee, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 15/738,901

(22) PCT Filed: Jun. 23, 2016

(86) PCT No.: PCT/SG2016/050288
§ 371 (c)(1),
(2) Date: Dec. 21, 2017

(87) PCT Pub. No.: WO2016/209170
PCT Pub. Date: Dec. 29, 2016

(65) Prior Publication Data
US 2018/0174767 A1    Jun. 21, 2018

(30) Foreign Application Priority Data
Jun. 23, 2015   (SG) .......................... 10201504975T

(51) Int. Cl.
*H01G 11/86* (2013.01)
*H01G 11/24* (2013.01)
(Continued)

(52) U.S. Cl.
CPC ............ *H01G 11/86* (2013.01); *C01G 31/02* (2013.01); *C01G 39/02* (2013.01); *C08L 45/00* (2013.01);
(Continued)

(58) Field of Classification Search
CPC ........ H01G 11/86; H01G 11/24; H01G 11/36; H01G 9/042
See application file for complete search history.

(56) References Cited

U.S. PATENT DOCUMENTS 6,510,042 B1    1/2003   Lee et al.

FOREIGN PATENT DOCUMENTS

CN     103219164 A     7/2013

OTHER PUBLICATIONS

Beyribey, "A new way of synthesis of $V_{0.13}Mo_{0.87}O_{2.935}$ and an investigation on its structural, thermal, and anodic properties," *Res Chem Intermed* 39:1183-1189, 2013.
(Continued)

*Primary Examiner* — Seahvosh Nikmanesh
(74) *Attorney, Agent, or Firm* — Seed IP Law Group LLP

(57) ABSTRACT

According to the present disclosure, a method for synthesizing a free-standing flexible electrode is provided. The method includes the steps of mixing a solution comprising vanadium powder, molybdenum powder and hydrogen peroxide to form a mixture comprising nanofibers represented by the formula of $V_{0.07}Mo_{0.93}O_3nH_2O$, filtering the mixture to form an electrode comprising the nanofibers, treating the electrode with an acidic solution, contacting the acid-treated electrode with a solution comprising monomers of a conductive polymer, and polymerizing the monomers in a medium comprising an oxidizing agent to form the conductive polymer. According to the present disclosure, there is also a free-standing flexible electrode comprising nanofibers comprised of molybdenum, vanadium and a conductive polymer, wherein the electrode is represented by a formula of $X—V_{0.07}Mo_{0.93}O_3n-H_2O$. In this formula, X is the conductive polymer and n is independently 1 or 2. According to
(Continued)

the present disclosure, storage devices comprising the electrode as defined above, are also provided.

20 Claims, 9 Drawing Sheets

(51) Int. Cl.
    *H01G 11/36* (2013.01)
    *H01G 9/00* (2006.01)
    *C01G 39/02* (2006.01)
    *H01G 9/042* (2006.01)
    *C01G 31/02* (2006.01)
    *C08L 45/00* (2006.01)
    *C08L 79/02* (2006.01)

(52) U.S. Cl.
    CPC .............. *C08L 79/02* (2013.01); *H01G 9/042* (2013.01); *H01G 11/24* (2013.01); *H01G 11/36* (2013.01); *C01P 2002/50* (2013.01); *C01P 2002/54* (2013.01); *C01P 2002/72* (2013.01); *C01P 2002/82* (2013.01); *C01P 2004/16* (2013.01); *C08L 2203/20* (2013.01)

(56) References Cited

OTHER PUBLICATIONS

Boyano et al., "Influence of acids in the Ppy/$V_2O_5$ hybrid synthesis and performance as a cathode material," *Journal of Power Sources* 174:1206-1211, 2007.

Burghard et al., "Hydrogen-Bond Reinforced Vanadia Nanofiber Paper of High Stiffness," *Adv. Mater.* 25:2468-2473, 2013.

Cao et al., "Strain effects in low-dimensional transition metal oxides," *Materials Science and Engineering R* 71:35-52, 2011.

Che et al., "High-strength carbon nanotube buckypaper composites as applied to free-standing electrodes for supercapacitors," *J. Mater. Chem. A* 1:4057-4066, 2013.

Chernova et al., "Layered vanadium and molybdenum oxides: batteries and electrochromics," *J. Mater. Chem.* 19:2526-2552, 2009.

Dong et al., "One dimensional $MnO_2$/titanium nitride nanotube coaxial arrays for high performance electrochemical capacitive energy storage," *Energy Environ. Sci.* 4:3502-3508, 2011.

Foo et al., "Flexible and Highly Scalable $V_2O_5$-rGO Electrodes in an Organic Electrolyte for Supercapacitor Devices," *Adv. Energy Mater.* 4:1400236, 2014 (7 pages).

He et al., "Freestanding Three-Dimensional Graphene/$MnO_2$ Composite Networks As Ultralight and Flexible Supercapacitor Electrodes," *ACS Nano* 7(1):174-182, 2013.

Jiang et al., "3D carbon based nanostructures for advanced supercapacitors," *Energy Environ. Sci.* 6:41-53, 2013.

Krebs, "Die Kristallstruktur von $MoO_3 \cdot 2H_2O$," *Acta Cryst.* B28:2222-2231, 1972 (with English abstract).

Kumar et al., "Redox Active Polyaniline-h-$MoO_3$ Hollow Nanorods for Improved Pseudocapacitive Performance," *J. Phys. Chem. C* 119:9041-9049, 2015.

Li et al., "Free-standing and binder-free sodium-ion electrodes with ultralong cycle life and high rate performance based on porous carbon nanofibers," *Nanoscale* 6:693-698, 2014.

Liu et al., "Folded Structured Graphene Paper for High Performance Electrode Materials," *Adv. Mater.* 24:1089-1094, 2012.

Liu et al., "Redox Exchange Induced $MnO_2$ Nanoparticle Enrichment in Poly(3,4-ethylenedioxythiophene) Nanowires for Electrochemical Energy Storage," *ACS Nano* 4(7):4299-4307, 2010.

Lu et al., "H-$TiO_2$@$MnO_2$//H-$TiO_2$@C Core-Shell Nanowires for High Performance and Flexible Asymmetric Supercapacitors," *Adv. Mater.* 25:267-272, 2013.

Lu et al., "$WO_{3-x}$@Au@$MnO_2$ Core-Shell Nanowires on Carbon Fabric for High-Performance Flexible Supercapacitors," *Adv. Mater.* 24:938-944, 2012.

Mai et al., "Lithiated $MoO_3$ Nanobelts with Greatly Improved Performance for Lithium Batteries," *Adv. Mater.* 19:3712-3716, 2007.

Noerochim et al., "Impact of mechanical bending on the electrochemical performance of bendable lithium batteries with paper-like free-standing $V_2O_5$-polypyrrole cathodes," *J. Mater. Chem.* 22:11159-11165, 2012.

Noerochim et al., "Rapid synthesis of free-standing $MoO_3$/Graphene films by the microwave hydrothermal method as cathode for bendable lithium batteries," *Journal of Power Sources* 228:198-205, 2013.

Peng et al., "Two dimensional nanomaterials for flexible supercapacitors," *Chem. Soc. Rev.* 43:3303-3323, 2014.

Sakaushi et al., "Aqueous Solution Process for the Synthesis and Assembly of Nanostructured One-Dimensional α-$MoO_3$ Electrode Materials," *Chem Mater.* 25:2557-2563, 2013.

Sugimoto et al., "Molybdenum Oxide/Carbon Composite Electrodes as Electrochemical Supercapacitors," *Electrochemical and Solid-State Letters* 4(9):A145-A147, 2001.

Sumboja et al., "Large Areal Mass, Flexible and Free-Standing Reduced Graphene Oxide/Manganese Dioxide Paper for Asymmetric Supercapacitor Device," *Adv. Mater.* 25:2809-2815, 2013.

Tao et al., "$MoO_3$ nanoparticles dispersed uniformly in carbon matrix: a high capacity composite anode for Li-ion batteries," *J. Mater. Chem.* 21:9350-9355, 2011.

Wang et al., "Supercapacitor Devices Based on Graphene Materials," *J. Phys. Chem. C* 113:13103-13107, 2009.

Weng et al., "Graphene—Cellulose Paper Flexible Supercapacitors," *Adv. Energy Mater.* 1:917-922, 2011.

Xiao et al., "Freestanding Mesoporous VN/CNT Hybrid Electrodes for Flexible All-Solid-State Supercapacitors," *Adv. Mater.* 25:5091-5097, 2013.

Xiao et al., "$WO_{3-x}$/$MoO_{3-x}$ Core/Shell Nanowires on Carbon Fabric as an Anode for All-Solid-State Asymmetric Supercapacitors," *Adv. Energy Mater.* 2:1328-1332, 2012.

Yan et al., "Facile Coating of Manganese Oxide on Tin Oxide Nanowires with High-Performance Capacitive Behavior," *ACS Nano* 4(7):4247-4255, 2010.

Yang et al., "Bioinspired Effective Prevention of Restacking in Multilayered Graphene Films: Towards the Next Generation of High-Performance Supercapacitors," *Adv. Mater.* 23:2833-2838, 2011.

Yang et al., "Hydrogenated ZnO Core-Shell Nanocables for Flexible Supercapacitors and Self-Powered Systems," *ACS Nano* 7(3):2617-2626, 2013.

Yuan et al., "Flexible Solid-State Supercapacitors Based on Carbon Nanoparticles/$MnO_2$ Nanorods Hybrid Structure," *ACS Nano* 6(1):656-661, 2012.

Zakharova et al., "Synthesis, characterization and magnetic properties of hexagonal $(VO)_{0.09}V_{0.18}Mo_{0.82}O_3 \cdot 0.54H_2O$ microrods," *Materials Letters* 65:579-582, 2011.

Zhai et al., "3D $MnO_2$-graphene composites with large areal capacitance for high-performance asymmetric supercapacitors," *Nanoscale* 5:6790-6796, 2013.

NANOFIBERS ELECTRODE AND SUPERCAPACITORS

CROSS-REFERENCE TO RELATED APPLICATION

This application claims the benefit of priority of Singapore patent application No. 10201504975T, filed 23 Jun. 2015, the content of it being hereby incorporated by reference in its entirety for all purposes.

TECHNICAL FIELD

The present disclosure relates to a method of synthesizing a free-standing flexible electrode. The present disclosure also relates to electrodes produced according to the method as disclosed herein.

BACKGROUND

In recent years, significant efforts have been devoted to fabricate flexible and planar electrodes for supercapacitors to meet the requirements of burgeoning modern-electronic industries and their demands.

Carbon based materials and their derivatives have been widely studied for their feasibility as flexible and free-standing electrode materials. For example, carbon nanotubes (CNT) have been introduced to form free-standing and flexible electrode materials. However, these carbon nanotubes tend to suffer from poor dispersion when used to produce the electrodes.

Graphene, another derivative of carbon, effectively circumvents the abovementioned difficulty to achieve highly stable dispersion of CNT but the mass of their electrodes (even if on a unit area basis) tends to be relatively low (0.5 mg cm$^{-2}$) and this leads to low capacitance per unit area, otherwise known as low areal capacitance.

Several strategies have been proposed to address the aforementioned limitations. One of the proposals includes the use of physically blended graphene-cellulose paper which showed areal capacitance as high as 81 mF cm$^{-2}$. Further, the areal capacitance may be improved to 94.5 mF cm$^{-2}$ by producing self-stacked solvated graphene paper.

More recently, it has been shown that the incorporation of pseudocapacitive materials, such as manganese oxide ($MnO_2$), vanadium oxide ($V_2O_5$), vanadium nitride (VN), zinc oxide (ZnO) core-shell configurations, tungsten oxide/molybdenum oxide ($WO_{3-x}/MoO_{3-x}$) etc., with carbon based materials (e.g. reduced-graphene oxide (rGO) or carbon fabric), improves the electrochemical capacitance due to the electrochemical coupling between the electrochemical double layer capacitance (EDLC) and the pseudocapacitive materials.

In another recent development, it has been demonstrated that areal capacitance as high as 897 mF cm$^{-2}$ may be achieved using rGO—MnO, paper electrode (half-cell configuration) with a relatively high loading mass of about 3.7 mg cm$^{-2}$. These electrodes with relatively high loading mass are capable of meeting the requirements for practical applications.

Despite the advantages associated with carbon based materials and their transition metal oxide/nitride composites, their performance may be deleteriously affected by various factors. For example, irreversible adsorption of solvated ions near the inner Helmholtz, layer may occur and this restricts the accessible active surface area. In another example, the stacking of graphene oxide nanosheets caused by strong interlayer interaction tends to limit the complete conversion to rGO and this may lead to the deposition of dense or thick metal oxide layers, thereby preventing diffusion of electrolyte ions and resulting in poor conductivity.

While transition metal oxides may be known for their superior electrochemical properties and versatile preparation routes, typical metal oxide nanostructures tend to lack mechanical flexibility due to their high coefficient of stiffness (Y=49 GPa, δ=200 MPa). To address this, free-standing $V_2O_5$ nanofibers have been explored while taking inter-fiber hydrogen bonding (H—H) into consideration. However, the desired mechanical flexibility (Y=24 GPa) remains unachievable.

Among the various known transition metal oxides, molybdenum trioxide ($MoO_3$) happens to be one of the more prominent material due to its high theoretical specific capacity (1117 mA h g$^{-1}$) and high specific energy density (750 Wh kg$^{-1}$). It has been explored for use as a prospective cathode as well as an anode material for Lithium ion (Li-ion) batteries. $MoO_3$ has also gained significant interest as a pseudocapacitive electrode material due to its high theoretical specific capacitance value (2700 F g$^{-1}$), which is associated with the fast faradic redox reactions facilitated by the solid-state diffusion of electrolyte ions (intercalation pseudocapacitance). In one example, free-standing flexible anode materials using $WO_{3-x}/MoO_{3-x}$ core-shell nanowires on carbon fabric have been designed for asymmetric supercapacitors and an areal capacitance of 216 mF cm$^{-2}$ was attained.

However, the metal oxide based free-standing electrodes as reported above tend to either suffer from low loading mass or rely on electrochemical/electronic active current collectors (e.g. carbon fabric, stainless steel, gold coated alumina membrane, etc.). Hence, there is a need to circumvent or ameliorate these limitations.

Accordingly, the formation of free-standing transition metal oxide electrodes without the need for a current collector (i.e, substrate free) is attractive for emerging deformable and conformable supercapacitors or batteries applications. This has been attempted by using a free-standing carbon black (20 wt %)-$MoO_3$ (80 wt %) nanofiber composite as the anode for Li-ion batteries. A high specific discharge capacity of 800 mA h g$^{-1}$ was attained. However, the prepared composite electrode failed to demonstrate flexibility and suffered from cracking of the nanofibers. The nanofibers were also restricted to a confined degree of orientation. In another study, graphene nanoflakes (30 wt %) with $MoO_3$ nanobelts (70 wt %) were used for forming a flexible cathode material in rechargeable bendable Li-ion batteries.

Based on the existing studies, conventional strategies to form free-standing flexible $MoO_3$ paper electrodes require conductive fillers, such as the carbon or graphene based materials, at a minimum amount of 20 wt % in order to achieve a reasonable level of conductivity.

Thus, there is a further need to provide for a free-standing flexible electrode with improved conductivity, areal capacitance, mechanical strength and loading mass that does not require support from carbon based current collectors or other substrates. There is also a need to provide for a method for producing such electrodes using lower amounts of conductive fillers. This method needs to be capable of enabling the electrode to harness its pseudocapacitive property.

SUMMARY

In one aspect, there is a method for synthesizing a free-standing flexible electrode, the method comprising:

mixing a solution comprising molybdenum powder, vanadium powder and hydrogen peroxide to form a mixture comprising nanofibers represented by the formula of $V_{0.07}Mo_{0.93}O_3H_2O$, wherein n is independently 1 or 2; filtering the mixture to form an electrode comprising the nanofibers; treating the electrode with an acidic solution; contacting the acid-treated electrode with a solution comprising monomers of a conductive polymer; and polymerizing the monomers in a medium comprising an oxidizing agent to form the conductive polymer.

In another aspect, there is a free-standing flexible electrode comprising nanofibers comprised of molybdenum, vanadium and a conductive polymer, wherein the electrode is represented by a formula of $X—V_{0.07}Mo_{0.93}O_3nH_2O$, wherein X is the conductive polymer and n is independently 1 or 2.

In another aspect, there is a storage device comprising the electrode as defined above.

Advantageously, the present method is capable of producing a free-standing flexible electrode without relying on a current collector such as the carbon based fabric or rGO. By circumventing the need for a current collector, the increase in production cost and reduction of the normalized capacitance of a device (e.g. supercapacitors) are mitigated. This is because dead cell components such as current collectors or even binders are no longer necessary for an electrode produced by the present method.

The present method advantageously allows the electrode to harness the pseudocapacitive properties of the materials used. The present method is also able to address the above-mentioned limitations of existing transition metal oxide electrodes.

The electrode produced according to the present method possesses high loading mass, improved areal capacitance, flexibility, mechanical strength and conductivity. The present electrode can be used in supercapacitors or other storage devices.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the present disclosure are described with reference to the following drawings, in which.

DETAILED DESCRIPTION

Figure 1:
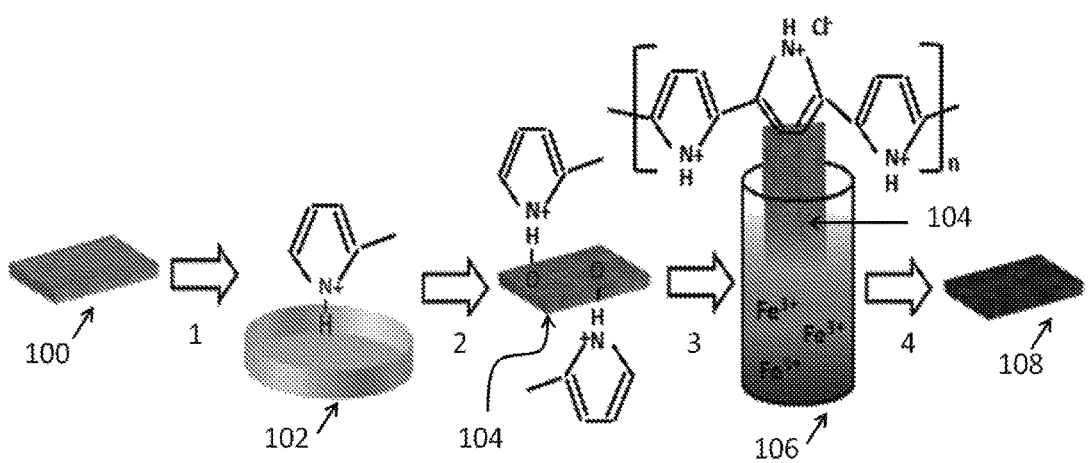
FIG. 1 is a schematic diagram showing the fabrication process of polypyrrole-vanadium doped $MoO_3$ (Ppy-$V_{0.07}Mo_{0.93}O_3nH_2O$) nanofibers hybrid paper electrodes, according to the present method as disclosed herein.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and changes may be made without departing from the scope of the invention. The various embodiments are not necessarily mutually exclusive, as some embodiments can be combined with one or more other embodiments to form new embodiments.

Embodiments described in the context of the present method are analogously valid for the electrode and storage device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The phrase "conductive polymer" is to be interpreted broadly to refer to a polymer having a measurable level of electrical conductivity and that which facilitates or allows an electric current to be passed through.

The phrase "optionally substituted" as used herein means the group to which this phrase refers to may be unsubstituted, or may be substituted with one or more groups independently selected from $C_1$-$C_{10}$-alkyl, $C_2$-$C_{10}$-heteroalkyl, $C_3$-$C_{10}$-cycloalkyl, 3 to 10 membered heterocycloalkyl, halogen, $C_1$-$C_{10}$-carboxyl, halo-$C_1$-$C_{10}$-alkyl, hydroxyl, an aryl having 6 to 10 carbon atoms or a 5 to 10 membered heteroaryl.

The term "alkyl" as a group or part of a group refers to a straight or branched saturated aliphatic group having from 1 to 10 carbon atoms, preferably having 1 to 6 carbon atoms unless otherwise noted. For example, an "alkyl" group can have 1, 2, 3, 4, 5, 6, 7, 8, 9 or 10 carbon atoms. The term "alkyl" includes, but is not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, decyl, and the like.

The term "heteroalkyl" refers to a straight-chain or branched-chain alkyl group having from 2 to 10 carbon atoms in the chain, one or more of which is a heteroatom suitably or independently selected from S, O or N. Exemplary heteroalkyls include alkyl ethers, secondary and tertiary alkyl amines, alkyl sulfides, and the like.

The term "cycloalkyl" as used herein refers to cyclic saturated aliphatic groups and includes within its meaning monovalent, saturated, monocyclic, bicyclic, polycyclic or fused polycyclic hydrocarbon radicals having from 3 to 10 carbon atoms, eg. 3, 4, 5, 6, 7, 8, 9, or 10 carbon atoms. Examples of cycloalkyl groups include but are not limited to cyclopropyl, 2-methylcyclopropyl, cyclobutyl, cyclopentyl, 2-methylcyclopentyl, 3-methylcyclopentyl, cyclohexyl, and the like.

The term "heterocycloalkyl" refers to a saturated monocyclic, bicyclic, or polycyclic ring containing at least one heteroatom selected from O, N and S, in at least one ring. Each ring may be from 3 to 10 membered (i.e. number of atoms in the ring structure), or more preferably 4 to 7 membered. Examples of suitable heterocycloalkyl substituents include pyrrolidyl, tetrahydrofuryl, tetrahydrothiofuranyl, piperidyl, piperazyl, tetrahydropyranyl, morphilino, 1,3-diazapane, 1,4-diazapane, 1,4-oxazepane, and 1,4-oxathiapane.

The term "halogen" or variants such as "halide" or "halo" as used herein refers to an element from group 17 of the periodic table. Examples include, but not limited to fluorine, chlorine, bromine and iodine.

The term "carboxyl" refers to any straight or branched chain group having a COOH moiety.

The expression "halo-$C_1$-$C_{10}$-alkyl" refers to a $C_1$-$C_{10}$-alkyl group having one or more halogens.

The term "aryl" as used herein refers to monovalent ("aryl") and divalent ("arylene") single, polynuclear, conjugated and fused residues of aromatic hydrocarbons having from 6 to 10 carbon atoms. Examples of such groups include phenyl, biphenyl, naphthyl, phenanthrenyl, and the like.

The term "heteroaryl" and variants such as "heteroaromatic group" as used herein refers to an aromatic monocyclic or multicyclic ring system having 5 to 10 ring atoms, in which one or more of the ring atoms is an element other than carbon, for example nitrogen, oxygen or sulfur, alone or in combination. "Heteroaryl" may also include a heteroaryl as defined above fused to an aryl as defined above. Non-limiting examples of suitable heteroaryls include pyridyl, pyrazinyl, furanyl, thienyl, pyrimidinyl, pyridone (including N-substituted pyridones), isoxazolyl, isothiazolyl, oxazolyl, thiazolyl, pyrazolyl, furazanyl, pyrrolyl, pyrazolyl, triazolyl, 1,2,4-thiadiazolyl, pyrazinyl, pyridazinyl, quinoxalinyl, phthalazinyl, imidazo[1,2-a]pyridinyl, imidazo[2,1-b]thiazolyl, benzofurazanyl, benzimidazolyl, benzothienyl, quinolinyl, imidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like. The term "heteroaryl" also refers to partially saturated heteroaryl moieties such as, for example, tetrahydroisoquinolyl, tetrahydroquinolyl and the like. Heteroaryl groups may be optionally substituted.

The term "heteroatom" or variants such as "hetero-" as used herein refers to O, N and S. Non-limiting examples of other suitable heteroatoms may include P, NH, or even halogens.

The phrase "transition metal" is to be interpreted broadly to refer to an element whose atom has a partially filled d sub-shell or one which can give rise to cations with an incomplete d sub-shell, in accordance with the definition of the International Union of Pure and Applied Chemistry (IUPAC). This may include, but not limited to, an element falling within groups 3 to 12 of the periodic table.

The term "nanofiber" or "nanofibers" is to be interpreted broadly to refer to a two or three dimensional structure where the length of the longest to the shortest axes of the structure differ significantly (typically by more than 1.5 times). A "nanofiber" may be cylindrical in nature. A "nanofiber" may include, but not limited to, a hollow cylinder with both open ends, a hollow cylinder with one open end, a hollow cylinder with both ends closed or a non-hollow cylinder. A structure that has two similar dimensions with a third dimension larger than the two dimensions may also qualify as a "nanofiber". A nanofiber may also have an elongated structure.

The phrase "paper", "paper-like", "nanosheet" or "nanosheets" is to be interpreted broadly to refer to a planar structure having an average thickness of not more than 1 mm, particularly not more than 0.5 mm or even more particularly not more than 0.1 mm. In the context of the present disclosure, the "nanosheets" may include, but not limited to, a sheet of material made from nanofibers or layers of nanofibers.

The phrases "oxidizing agent", "oxidant" or variants thereof refer to any substance that is capable of oxidizing any other substances (cause them to lose electrons) or a substance that has the ability to transfer electronegative atoms (e.g. oxygen) to another substance. Non-limiting examples of some common oxidizing agents may be oxygen, hydrogen peroxide, ferric chloride and fluorine.

The phrase "organic solution" refers to a solution that completely excludes water. An organic solution may be of polar or non-polar nature. When an expression, a phrase or another term is used together with the term "organic", for instance an "organic solution" or "organic compound", this simply means that the organic substance or material referred to comprises mainly of carbon without excluding the presence of other components such as halogen, nitrogen, oxygen etc. Non-limiting examples may include alcohols, organic acids or even hydrocarbons.

The term "aqueous" or "aqueous solution" refers to a solution in which the solvent is water or the bulk of the solution is water.

The word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one car more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Unless specified otherwise, the terms "comprising" "comprise", and grammatical variants thereof, are intended to represent "open" or "inclusive" language such that they include recited elements but also permit inclusion of additional, unrecited elements.

The present disclosure relates to a method for synthesizing a free-standing flexible electrode, the method comprising: mixing a solution comprising molybdenum powder, vanadium powder and hydrogen peroxide to form a mixture comprising nanofibers; filtering the mixture to form an electrode comprising the nanofibers; treating the electrode with an acidic solution; contacting the acid-treated electrode with a solution comprising monomers of a conductive polymer; and polymerizing the monomers in a medium comprising an oxidizing agent to form the conductive polymer. The nanofibers may be represented by a formula of $V_{0.07}Mo_{0.93}O_3 nH_2O$, wherein n may be independently 1 or 2.

The present disclosure may also provide a method for synthesizing a free-standing flexible electrode. The method includes mixing one or more powders comprising at least one transition metal with hydrogen peroxide to form a mixture comprising nanofibers, filtering the mixture to form an electrode comprising the nanofibers, treating the electrode with an acidic solution, and providing the acid-treated electrode with a conductive polymer. In some embodiments of the present method, the conductive polymer may be formed directly on the acid-treated paper electrode after drying in air instead of attaching the monomers onto the dried acid-treated paper electrode first and then polymerizing the attached monomers to form the conductive polymer.

Non-limiting examples of transition metals that may be used in the present method may be selected from the group consisting of molybdenum, titanium, tungsten, vanadium and zinc. Particularly, the transition metal used may be molybdenum and/or vanadium. Accordingly, the one or more powders used to form the nanofibers may contain vanadium and/or molybdenum.

In the present method, the order in which the powders are mixed does not have any effect on the formation of the nanofibers. This means that the powder containing vanadium can be first prepared and transferred to a mixer or any reactor suitable for mixing. Subsequently, the molybdenum powder and hydrogen peroxide may be added. In another instance, the powder containing the molybdenum may be first added followed by the vanadium powder and thereafter the hydrogen peroxide.

In an alternative instance, the vanadium powder and the molybdenum powder can be mixed before being added to the hydrogen peroxide in a reactor. In yet another instance, the molybdenum powder, vanadium powder and hydrogen peroxide may be prepared as a solution and transferred or poured into a mixer or reactor for mixing to form the nanofibers. Accordingly, there is no restriction on the sequence in which the starting materials may be prepared or added to the mixer or reactor.

In the present method, the amount of molybdenum powder mixed or used may be about 85 to about 95 wt % of the mixed vanadium and molybdenum powders or based on the mixed vanadium and molybdenum powders. The amount of molybdenum powder used may also be about 85 to about 90 wt % or about 90 to about 95 wt %, based on the total weight of the molybdenum and vanadium powders used. The weight percentages of molybdenum powder used or mixed may be calculated solely based on the total weight of the powders used or mixed without considering the weight of the hydrogen peroxide used. This is because the hydrogen peroxide used may be in the form of a liquid solution and hence it may be more convenient for a person skilled in the art to simply calculate the amount of molybdenum powder based on the total weight of the powders used or mixed.

As for vanadium, the powder mixed may be about 5 to about 15 wt %, about 5 to about 10 wt % or about 10 to about 15 wt %, of the mixed vanadium and molybdenum powders or based on the molybdenum and vanadium powders that are mixed. These weight percentages may be calculated without taking into consideration the amount of liquid hydrogen peroxide for the same reason as mentioned above.

Preferably, the amount of vanadium powder added or mixed may be in the range of about 5 to about 10 wt % based on the total weight of the molybdenum and vanadium powders mixed. This means that the vanadium mixed may be about 5, 6, 7, 8, 9 or 10 wt %. The doping of vanadium may impart flexibility to the resultant paper-like electrode and hence the amount of vanadium added or mixed may affect the flexibility of the resultant paper-like electrode. The amount of vanadium used may also affect the formation of the nanofibers. The formation of free-standing flexible nanofibers paper-like electrode is unlikely to occur if the amount of vanadium used exceeds 15 wt %. Particularly, free-standing flexible nanofibers paper-like electrode may have difficulty forming if the amount of vanadium added is at least about 20, 30 or 40 wt %. The formation of the paper-like electrode may be due to the nanofibers' morphology. The nanofibers may be entangled due to hydrogen bonding which are possibly reinforced by hydroxyl groups present on the surface of the nanofibers. If a high amount of vanadium is used, such as 20 wt % or more, the nanofibers may evolve to significantly thicker nanorods or micorods. These nanorods or microrods may have a cylindrical or elongated structure as defined above for a nanofiber. However, a nanorod may have a diameter in the range of about 200 to about 500 nm and a microrod may have a diameter in the range of about 1 to about 3 μm while a nanofiber may have a diameter of less than 200 nm. Due to the thicker configuration of these nanorods or micorods, the hydrogen bonding for these structures may be diminished and the entanglement may be less pronounced or even non-existent, thereby leading) the formation of non-flexible or brittle powder-like electrodes.

Apart from transition metal powders, the transition metal may be added in any other suitable solid forms such as pellets, crystals etc.

The synthesis of the nanofibers mixture may utilize a straightforward peroxo-complex (or per-oxo-complex) assisted chemical mechanism. The formation of $V_{0.07}Mo_{0.93}O_3 \cdot nH_2O$ nanofibers is likely a result of the poly-condensation process of oxo-peroxo species of molybdenum and vanadium. A yellow peroxomolybdaic/vanadaic solution may be obtained in an acidic medium of about pH 1 to 1.5 and this solution may consist of monomers and dimers of peroxo-species i.e. $[MoO(O_2)_2(H_2O)_2]$, $[O\{MoO(O_2)_2(H_2O)_2\}]^2$, $V_{10}O_{26}(OH)_2^{4-}$ and other complex poly-peroxo species. Due to the highly reactive nature of peroxo species, the nucleation of nanofibers then tends to occur. The complexes of vanadium and molybdenum may be made into a solid solution due to their similar radii in the highest oxidation states i.e. $V^{5+}$ and $Mo^{6+}$. In this instance, a solid solution (or sometimes known as a solid-state solution) may be a system in which a minor component is uniformly distributed within the crystal lattice of the major component such that the crystal phase of the major component does not deviate from its original phase. Such a solid solution or solid-state solution/mixture may be considered a solution rather than a compound as the crystal structure of the solvent may remain unchanged after addition of the solutes. The solid solution or mixture may remain in a single homogeneous phase. A solid solution may be distinguished from a mechanical mixture of powdered solids like two salts, sugar and salt etc. Non-limiting examples of solid solutions may include crystallized salts from their liquid mixture, metal alloys or even moist solids.

In the present method as disclosed herein, the nanofibers may be produced under hydrothermal conditions with the use of a peroxide. An example of a suitable peroxide may be hydrogen peroxide. The hydrogen peroxide used may be in the form of a solution, such as an aqueous solution. The hydrogen peroxide may have a concentration of about 10 to about 25 wt % or any concentration falling within this range e.g. about 10 to about 20 wt %, about 10 to about 15 wt %, about 15 to about 20 wt %, about 15 to about 25 wt % or about 20 to about 25 wt %. This percentage may be derived based on the weight of $H_2O_2$ against the weight of the solvent. For example, a 30% or 30 wt % $H_2O_2$ may consist of 30 wt % of $H_2O_2$ and 70 wt % of the solvent. The volume of peroxide used, particularly hydrogen peroxide, may be about 30 to 50 about 30 to 40 ml, about 40 to 50 ml or any volume falling within this range. Preferably, the volume of hydrogen peroxide used may be 40 ml. The volume of hydrogen peroxide used may depend on the amount of molybdenum or vanadium used. The volume of hydrogen peroxide to be used may also depend on the total weight of the molybdenum and vanadium used. For instance, taking a 380 mg mixture consisting of 90 wt % molybdenum and 10 wt % vanadium powders, a suitable volume of hydrogen peroxide which may be used is 40 ml. Hence, there may also be a particular ratio for determining the amount of hydrogen peroxide to be used (380 mg powder: 40 ml of $H_2O_2$). Accordingly, the amount of hydrogen peroxide used may be changed based on this ratio when the total amount of molybdenum and vanadium used is varied. In some embodiments, the amount of hydrogen peroxide used stay be 30 to 50 ml and this may depend on the total amount of molybdenum and vanadium powders used. For example, if the weight of the mixed molybdenum and vanadium powders is 475 mg, the amount of hydrogen peroxide to be suitably used may be 50 ml. The strength or concentration of the peroxide solution used may affect the initial formation of molybdenum trioxide ($MoO_3$) free-standing nanofibers or nanosheets. Free-standing nanofibers paper-like electrodes or nanosheets may have difficulties forming when other concentrations or strength (e.g. 5 wt % or 30 wt %) of hydrogen peroxide are used apart from the abovementioned range. This is because the use of 11202 concentrations or strength falling outside the abovementioned range (10 to 25 wt %) may affect the mechanism of dimer formation between the molybdenum and vanadium species, thereby affecting the formation of the molybdenum-vanadium based electrode.

In order for the hydrothermal synthesis of the nanofibers to occur, heating of the mixture is required. Once the powders are mixed with the $H_2O_2$ solution, the initial mixture may be stirred for about 5 to about 10 hours or up to 10 hours in order to achieve a homogenous mixture. Thereafter, this mixture may be heated up to about 160 to about 200° C., about 170 to about 200° C., about 170 to about 190° C. or even about 160, 170, 180, 190 or 200° C., with or without stirring. An undesirable amount of the mixed powders may be left over due to incomplete or insufficient reaction if temperatures lower than 160° C. are used. This heated mixture is then maintained at these temperatures, e.g. 170 to about 190° C., for another 18 to 24 hours with or without stirring.

In various embodiments, in order for the nanofibers to be formed, the mixing of the abovementioned components or precursors such as the various transition metal powders and the hydrogen peroxide solution may preferably be carried out first and followed by the heating of the mixture or as-prepared solution. It may be preferred that no heating occurs during the mixing of the precursors or no stirring occurs during the heating of the precursors or even when the heated mixture is maintained at the abovementioned temperatures. However, this does not mean that the present method is limited to this procedure. Other procedures capable of forming nanofibers based on the present components or method may apply.

The nanofibers formed via the hydrothermal synthesis procedure may be represented by the formula $V_{0.07}Mo_{0.93}O_3 \cdot nH_2O$. In this formula, n may be 1 or 2 as the lattice of $V_{0.07}Mo_{0.93}O_3$ may not be capable of holding more water molecules. For n<1, hydrogen bonding may be affected. $MoO_3$ nanofibers may be formed via the present method. However, because vanadium is mixed with molybdenum or vanadium is doped into the reaction mixture containing hydrogen peroxide at the beginning, nanofibers based on $V_{0.07}Mo_{0.93}O_3 \cdot nH_2O$ may be formed eventually. Hence, the resultant electrode formed via the present method may contain transition metal, transition metal oxides or their combinations thereof. The formula $V_{0.07}Mo_{0.93}O_3 \cdot nH_2O$ may be cation deficient due to the partial substitution of $Mo^{6+}$ by $V^{5+}$ ions. This positive charge deficit may be made up for by the holes which may be produced during V—O formation, wherein the V—O bond is likely to be less electronegative than the Mo—O bond.

After the step of forming the nanofibers in the mixture or reaction solution, the mixture or solution containing the nanofibers is then filtered. The filtration step may be a vacuum filtration procedure. The filtration may occur under total vacuum or partial vacuum in various embodiments, the filter may be a piece of membrane. The filtration may be carried out under partial vacuum filtration, where the top or one side of the filter or filter membrane is exposed to ambient atmosphere while the bottom or the opposing side is exposed to partial vacuum conditions (about 0.1 to about 1 torr or about 13.33 to about 133.32 Pa).

The mixture may be filtered via a flow directed assembly. Such an assembly enables the nanofibers solution to be directionally filtered. A flow directed assembly may be, for instance, a vertical filtration system or process in which a filtering flask with a barbed sidearm is used. A filter, such as a piece of membrane, may be placed at or on top of the flask. A vacuum pump may be connected to the sidearm and the solution may then be filtered through the membrane to obtain nanofibers paper. The filter paper used in the present filtration step may be a nylon filter paper or nylon membrane. This nylon filter paper may be a Whatman filter paper. Other suitable filter papers may be used. The filter paper may have a maximum pore size of 1 μm. The pore size of the filter paper may be selected based on the dimensions of the nanofibers formed. Suitable pore sizes may be those that are capable of preventing the nanofibers from passing through the filter paper along with the filtrate. Filter papers with appropriate pore size distribution may also be used. Filters with unsuitably large pore sizes may lead to attrition of the Materials or nanofibers while unsuitably small pore sizes may cause the filtration process to become too time consuming.

When the solution passes through the filter paper, the nanofibers come into contact with the filter paper and these nanofibers may tend to align along the direction of the filtrate flow such that they firmly formed a paper-like material. The nanofibers may also distinctly stack onto each other to form nanosheets on the filter paper due to the direction of the filtrate flow. This means that it remains possible to distinguish each layer of nanofibers as firmly stacked but separated sheets.

Through this filtration procedure, the residue comprising the nanofibers or nanosheets may be formed as a paper-like material. The stacked nanofibers or nanosheets may be described as a paper-like material because the average thickness of these stacked nanofibers or nanosheets may not exceed about 1 mm, about 0.5 mm or even about 0.1 mm. Such a material containing the stacked nanofibers or nanosheets may also be known as an electrode, a paper electrode, a paper-like electrode, nanosheets paper, nanosheets electrode, nanosheets paper electrode, nanofibers paper, nanofibers electrode or even nanofibers paper electrode.

Once filtration is completed, the filter paper may be dried under ambient conditions. Ambient conditions may include, but not limited to, room temperatures in the range of 25 to 35° C. and atmospheric pressure. Thereafter, the dried $V_{0.07}Mo_{0.93}O_3 \cdot nH_2O$ nanofibers paper electrode may be peeled off from the filter paper. The separation or peeling of the paper electrode or nanosheets from the filter paper may be performed manually with or without the aid of a device. No solvent or dissolution of the filter paper is required via the present filtration procedure.

Based on the above, the present method is capable of circumventing the need for a substrate to support the nanofibers paper. The present method is also capable of circumventing the need for any current collectors to serve as a supporting substrate or to improve the conductivity of these nanofibers.

The filtered paper-like material formed from the nanofibers (hereinafter described as a paper electrode, nanofibers electrode, nanofibers paper, nanofibers paper electrode or an electrode) is treated with an acidic solution for about 5 to about 10 hours at ambient conditions or room temperature (25 to 35° C., 25 to 30° C. or even 35° C.). The acid treatment may take up to about 8 hours at ambient conditions or room temperature. The electrode may be modified or cut into appropriate dimensions/shapes prior to acid treatment. This may be necessary to accommodate the size of the reactor containing the acid solution so that the paper electrode can be dipped entirely into the reactor. A non-limiting example of such a reactor may be a simple glass petri dish. The modification of the size or shape of the electrode may also be required for any other purposes, such as to accommodate the size or configuration of the device in which the electrode is to be used.

The acidic solution may be nitric acid. Other suitable acids may also be used. The concentration of the acid used may be about 4 to about 6 M, or 4, 5 or 6 M. For instance. 5 M of $HNO_3$ may be used for treating the filtered electrode.

The acid treatment step may be required to enhance the wetting or improve the hydrophilicity of the $V_{0.07}Mo_{0.93}O_3 \cdot nH_2O$ nanofibers paper electrode. This helps the monomers to attach to the nanofibers paper electrode when the electrode is soaked in a solution containing the monomers at a later stage. $V_{0.07}Mo_{0.93}O_3 \cdot nH_2O$ paper electrodes which have not been subjected to acid treatment before soaking in a monomer solution may not undergo polymerization successfully (in later stages of the present method when providing the conductive polymer) due to the electrodes' poor wetting property. The monomers may also fail to attach to the nanofibers on the paper electrode. Consequently, effective polymerization may not occur due to insufficient attachment of monomers. The acid treatment may be needed to completely oxidize the nanofibers. This step may be necessary to achieve uniform polymerization of the monomer e.g. aniline or pyrrole. Hence, the acid treatment step may have to be carried out before contacting the filtered electrode with a solution comprising a monomer of the conductive polymer or providing the electrode with a conductive polymer.

The acid-treated electrode may be dried immediately after acid treatment. The acid-treated electrode may also be dried before providing the conductive polymer or monomer. The drying of the acid-treated electrode may be carried out in a fume hood.

If the dimensions of the $V_{0.07}Mo_{0.93}O_3nH_2O$ paper electrode was not modified prior to acid treatment, the paper electrode may be modified or cut into appropriate sizes or shapes after drying from the acid treatment. The modification step may take place after drying from the acid treatment in order to expose more surface area of the electrode to air for drying. This may also expedite the removal of residual acid. The step of modifying or cutting the electrode to an appropriate dimension/shape may occur at any suitable time in the present method.

The acid-treated electrode or dried acid-treated electrode may be contacted with a solution having monomers before transferring the electrode to a medium comprising an oxidizing agent for polymerizing the monomers to provide the conductive polymer. The monomers may be any monomers suitable for forming a conductive polymer. Accordingly, the monomers may be monomers of a conductive polymer. The solution comprising the monomers may be an organic solution. In some embodiments, the monomers may be the organic solution or no organic solution is used with the monomers. The monomers may attach onto the nanofibers of the paper electrode. The attached monomers may be polymerized to form a conductive polymer on the nanofibers electrode, which may improve the conductivity of the resultant electrode. The acid-treated or dried acid-treated electrode may be contacted with the monomer solution for at least 10 minutes at room temperature. This duration may be required for uniform polymerization in subsequent steps. The room temperature may be 20 to 35° C. For instance, the dried electrode may be contacted with the monomer solution for 10 minutes at room temperature. The monomers used in the present method for forming the conductive polymer may comprise optionally substituted aniline (may be known as phenylamine, $C_6H_5NH_2$) or pyrrole ($C_4H_4N^+H$) units.

After contacting or soaking the electrode in the monomer solution, the monomers attached on the electrode may be polymerized in a medium comprising an oxidizing agent to form the conductive polymer. In one instance, the electrode may be directly transferred to a medium comprising an oxidizing agent after contacting the monomer solution. In another instance, after contacting the electrode with the monomer solution, the electrode may be dried, substantially dried or may not be dried before the transfer. The medium comprising the oxidizing agent may be contained in any reactor or suitable apparatus such as a simple container. The medium comprising the oxidizing agent may be an aqueous medium. The medium may be an oxidant solution or an acidic solution. The medium used may depend on the oxidizing agent present. Particularly, the medium may be hydrochloric acid. The hydrochloric acid medium may have a concentration of 2.6 M.

The transferred electrode may be soaked or dipped into the medium for at least 10 minutes. For instance, the transferred electrode may be contacted with the medium comprising the oxidizing agent for 15 minutes. The medium may be at a temperature of 2 to 6° C. Particularly, the medium may be at 4° C. when contacted with the electrode.

The oxidizing agent in the medium may be a ferric chloride solution or takes the form of $FeCl_3.6H_2O$. The oxidizing agent may also comprise ammonium persulfate. Other suitable oxidizing agents may be used.

The oxidative treatment of the electrode that has been contacted with the monomer solution or coated with the monomer via contact with the monomer solution, helps to polymerize the monomers that may be attached on the paper electrode, particularly nanofibers. In the instance where optionally substituted aniline or pyrrole monomers are attached, the conductive polymer formed may comprise an optionally substituted polyaniline (Pan) or polypyrrole (Ppy), respectively. Hence, the $V_{0.07}Mo_{0.93}O_3nH_2O$ nanofibers paper electrode may be eventually decorated with polyaniline or polypyrrole or even other suitable conductive polymers. This oxidative treatment may be required for improving the conductivity of the resultant coated $V_{0.07}Mo_{0.93}O_3nH_2O$ nanofibers paper electrode through the conductive polymer formed, which may enable the electrode to harness its pseudocapacitive properties for use as a supercapacitor. Advantageously, the resultant electrode may have an increased conductivity of up to 0.1 S cm$^{-1}$.

Through the present method, the amount of conductive additives or fillers, such as the conductive polymer provided, may be less than 20 wt %. Advantageously, the conductive polymer provided may be 11 wt %.

Once the polymerized electrode has been formed, it may be washed and/or dried. The polymerized electrode may be washed with copious amount of acid and/or de-ionized water after the conductive polymer is provided on the electrode. This helps to ensure that any residual monomers or polymers, some of which may not be properly attached to the nanofibers, may be removed. The acid may be hydrochloric acid. The strength or concentration of the acid used should not be so high such that the attached polymers become damaged. A suitable acid strength may be 0.3 M HCl. The drying may take place in a fume hood at room temperature.

An embodiment of the present method has been illustrated in FIG. 1. This embodiment has been provided to aid in the understanding of the present method and to illustrate an embodiment of the present method and its principles. FIG. 1 in no way limits the present method to the steps as shown in FIG. 1. FIG. 1 is a schematic diagram showing how the resultant electrode can be made according to the method of the present disclosure.

According to FIG. 1, a piece of $V_{0.07}Mo_{0.93}O_3nH_2O$ nanofibers paper electrode 100 (VM NP) is prepared and soaked in a petri dish 102. The petri dish 102 contains a solution having the pyrrole monomer. This soaking process 1 may take about 10 minutes or more at room temperature. The VM NP electrode 100 may be treated with an acid and subsequently dried before soaking.

After soaking, the pyrrole monomers become attached to the nanofibers on the paper electrode 104. The attachment of the pyrrole monomers is possible due to the availability of the positively charged $N^+H$ ions and the negatively charged oxygen vacancies or hydroxyl ions on the surface of the $V_{0.07}Mo_{0.93}O_3nH_2O$ nanofibers.

The pyrrole attached VM NP electrode 104 is then directly transferred 3 to a container 106 having an oxidant solution. The electrode 104 is left in the container 106 for about 15 minutes at about 4° C. The oxidizing agent in this solution may be $FeCl_3$. This oxidizing agent aids in the polymerization of the pyrrole monomer to form the polypyrrole-$V_{0.07}Mo_{0.93}O_3nH_2$ nanofibers hybrid paper electrode (Ppy-VM NHP).

After polymerization, the Ppy-VM NHP electrode is removed from the container 106 for washing and drying 4 with an acid and de-ionized water to obtain the resultant Ppy-VM NHP electrode 108.

The present disclosure also provides a free-standing flexible electrode produced according to the method as featured above. The electrode may also comprise nanofibers comprising at least one transition metal and a conductive polymer.

According to the present disclosure, there may be a free-standing flexible electrode comprising nanofibers comprised of molybdenum, vanadium and a conductive polymer, wherein the electrode may be represented by a formula of:

$$X—V_{0.07}Mo_{0.93}O_3 \cdot nH_2O$$

wherein X may be the conductive polymer and n may be independently 1 or 2. The formula $V_{0.07}Mo_{0.93}O_3nH_2O$ may be cation deficient due to the partial substitution of $Mo^{6+}$ by $V^{5+}$ ions. This positive charge deficit may be made up for by the holes which may be produced during V—O formation, wherein the V—O bond is likely to be less electronegative than the Mo—O bond.

In one instance, the amount of water or crystallization water (water of hydration) may be about 1.7 wt %. This may be derived from thermogravimetric analysis (TGA) of the resultant electrode or through other suitable methods.

The transition metal may be selected from the group consisting of molybdenum, titanium, tungsten, vanadium and zinc. The resultant electrode may be formed from molybdenum and/or vanadium. The resultant electrode may contain about 49.46 to about 55.29 wt % of molybdenum or any amount of molybdenum falling within this range, based on the weight of the resultant electrode. The amount of molybdenum present may be 55.26 wt % based on the weight of the resultant electrode. The electrode may contain about 2.43 to about 7.33 wt % vanadium based on the weight of the resultant electrode.

As mentioned above, according to the present method, as vanadium is doped into the $MoO_3$ nanofibers or mixed with molybdenum and hydrogen peroxide at the start, the electrode eventually formed may be based on $V_{0.07}Mo_{0.93}O_3nH_2$ nanofibers due to these starting reactants and the peroxo-complex chemical reactions. The addition of vanadium imparts flexibility to the electrode.

The nanofibers electrode may be decorated or coated with a conductive polymer. The conductive polymer may comprise or may be an optionally substituted polyaniline or polypyrrole. The amount of conductive polymer present in the resultant electrode may be less than 20 wt %. The amount of conductive polymer present in the resultant electrode may preferably be 11 wt %. The weight percentage of the conductive polymer may be derived based on the weight of the resultant electrode.

The composition of the various components forming the resultant electrode may be as follows. In one instance, the water of hydration may be 1.7 wt % (based on TGA analysis). This means that if the total weight of the resultant electrode happens to be 20 mg, 0.34 mg of the electrode may be attributed to these water molecules (water of hydration). In another instance, the polyaniline or polypyrrole conductive polymer may be 11 wt %. This means that if the total weight of the resultant electrode happens to be 20 mg, 2.2 mg may be attributed to polyaniline or polypyrrole. In some instances, the $MoO_x$ content in the resultant electrode may be 82.9 wt %. This means that if the total weight of the resultant electrode happens to be 20 mg, 16.58 mg may be attributed to molybdenum oxide. In a stable formula unit of molybdenum oxide i.e. $MoO_3$, the wt % of Mo and O may be 55.26 wt % and 27.63 wt %, respectively, in some instances. In yet another instance, the $VO_x$ content in the resultant electrode may be 4.3 wt %. This means that if the total weight of the resultant electrode happens to be 20 mg, 0.86 mg may be attributed to vanadium oxide. In a stable formula unit of vanadium oxide i.e. $V_2O_5$, the wt % of V and O may be 2.43 wt % and 1.89 wt %, respectively, in some instances. In some other instances, the wt % of oxygen (O) in the transition metal oxide component(s) of the resultant electrode (not from the water of hydration) may not be specified since oxygen is unlikely to be a free element in the resultant electrode as it may be attached with molybdenum (Mo) and vanadium (V). Despite this, the amount of oxygen from the transition metal oxide component(s) of the resultant electrode, if taken as a single element, may be about 29.52 to about 30.48 wt %.

Regardless of the compositional percentages as specified in the various instances above, the conductive polymer present in the resultant electrode may be less than 20 wt %, or preferably 11 wt %, and the amount of the other components present in the resultant electrode may add up such that the total weight percentages of these components, including the conductive polymer, is 100 wt %.

In one instance, the resultant electrode may represented by the formula $X—V_{0.07}Mo_{0.93}O_3nH_2O$, wherein X is polyaniline (Pan) or polypyrrole (Ppy) and n is 2. As described above, the present electrode may be paper-like. This means that the resultant electrode may have an average thickness of at most about 1 mm, or at most about 0.5 mm or at most about 0.1 mm. As the resultant nanofibers electrode is composed of a polyaniline or polypyrrole coated, vanadium doped transition metal, transition metal oxide or their combinations thereof, such a paper-like electrode may be described as a nanofibers hybrid paper, particularly a Pan-$V_{0.07}Mo_{0.93}O_3nH_2O$ or Ppy-$V_{0.07}Mo_{0.93}O_3nH_2O$ nanofibers hybrid paper (Pan-VM NHP or Ppy-VM NHP) electrode.

Advantageously, the present electrode (e.g. Pan-VM NHP or Ppy-VM NHP electrode), obtained according to the present method, may not require a current collector or any substrate. The present electrode may be obtained via a peroxo-complexes assisted reaction which is likely to be a mild chemical synthesis procedure that does not require extreme temperatures or pressures, or additional catalysts. The present electrode may be advantageously produced with lesser conductive additives or fillers, such as the conductive polymers, compared to conventional electrodes. Hence, the present electrode may be produced with reduced cost.

The present electrode (e.g. Pan-VM NHP or Ppy-VM NHP electrode) may also have improved pseudocapacitive properties. The present electrode may possess high flexibility and high loading mass of Pan-$V_{0.07}Mo_{0.93}O_3nH_2O$ or Ppy-$V_{0.07}Mo_{0.93}O_3nH_2O$ nanofibers. Hence, the present electrode can demonstrate remarkable flexibility even at high loading mass, which allows them to be shaped into any desired structure (bending angle of about 72°) without breaking or cracking.

The present electrode (e.g. Pan-VM NHP or Ppy-VM NHP electrode) produced according to the present method may mitigate dead cell components, such as current collectors, binders and other components that may be present in conventional supercapacitor devices. These dead components tends to increase production costs as well as reduce the normalized capacitance of a supercapacitor device. Advantageously, the areal capacitance of the present electrode, such as the Ppy-VM NHP electrode, may be as high as 991 mF cm$^{-2}$. This is significantly better compared to conventional electrodes or capacitors as described in the background section or in the examples below.

The present electrode (e.g. Pan-VM NHP or Ppy-VM NHP electrode) produced according to the present method is also capable of demonstrating improved mechanical strength. The measured tensile strength and Young modulus of the resultant Ppy-VM NHP electrode is about 37.3 MPa and 6.89 GPa, respectively.

Accordingly, the present free-standing flexible electrode composed of distinctly separated layers of Ppy-VM (or even Pan-VM) nanofibers may be fabricated at lower cost (based on the present disclosure and the present method) with a thin cross-section thickness and high loading mass (about 4 mg) without compromising areal or volumetric performance.

The present disclosure also relates to a storage device comprising the electrode as defined above. The present electrode may find applications in storage devices possibly selected from the group consisting of capacitors, supercapacitors, batteries, hybrid electric storage devices and electronic devices. The present electrode may also be used in other devices for storage purpose or as supercapacitors. Devices made based on the present electrode would have the advantages as discussed above.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present disclosure relates to a method for synthesizing free-standing flexible nanofibers paper electrode made from transition metals or their oxides. Due to the higher material density and pseudocapacitive behavior of transition metals or their oxides, particularly the $V_{0.07}Mo_{0.93}O_3nH_2O$ nanofibers as described above, an improved volumetric (or areal) performance can be achieved for symmetric supercapacitors that are made of Ppy-$V_{0.07}Mo_{0.93}O_3nH_2O$ nanofibers paper electrodes as compared to carbon based electrodes. Accordingly, the following examples illustrate the method and advantageous properties which a device composed of Ppy-$V_{0.07}Mo_{0.93}O_3nH_2O$ nanofibers paper electrodes, or even Pan-VM NHP electrodes, would have.

Example 1: Polymerization of $V_{0.07}Mo_{0.93}O_3nH_2O$ Nanofibers Paper

The fabrication process of polypyrrole-$V_{0.07}Mo_{0.93}O_3nH_2O$ nanofibers hybrid paper (Ppy-VM NHP) electrode is illustrated in FIG. 1.

Firstly, $V_{0.07}Mo_{0.93}O_3nH_2O$ nanofibers were synthesized under hydrothermal conditions with $H_2O_2$ solution used as the reaction solvent. Vacuum filtration (Whatman filter paper) of the as-obtained solution was then carried out to produce the $V_{0.07}Mo_{0.93}O_3nH_2O$ nanofibers paper (VM NP). This filtration process or system is a vertical filtration flow system in which a filtering flask with barbed sidearm is used. A filter membrane is placed on the top of the flask. A vacuum pump is then connected to the sidearm and the solution is filtered through the membrane to obtain nanofibers paper. The as-produced VM NP electrode was soaked in $HNO_3$ (to completely oxidize the nanofibers) and dried at room temperature. Although the as-prepared nanofibers paper may be in its highest oxidation state, acid treatment is still carried out to ensure uniform oxidation of the surface of the paper electrode which may aid in uniform polymerization of the monomer such as pyrrole or aniline. Thereafter, the VM NP was soaked for 10 minutes in a solution containing pyrrole monomers ($C_4H_4N^+H$). The pyrrole monomers attach to the VM NP due to the presence of positively charged protonic $N^+H$ ions at the pyrrole ring and the negatively charged oxygen vacancies or hydroxyl ions on the surface of the VM NP. Subsequently, the pyrrole attached $V_{0.07}Mo_{0.93}O_3nH_2O$ nanofibers paper was immersed into a 0.3 M $FeCl_3.6H_2O$ solution (in 0.3 M HCl) at 4° C. for 15 minutes. The polymerized $V_{0.07}Mo_{0.93}O_3nH_2O$ nanofibers paper electrode was then washed and dried at room temperature.

Figure 2A:
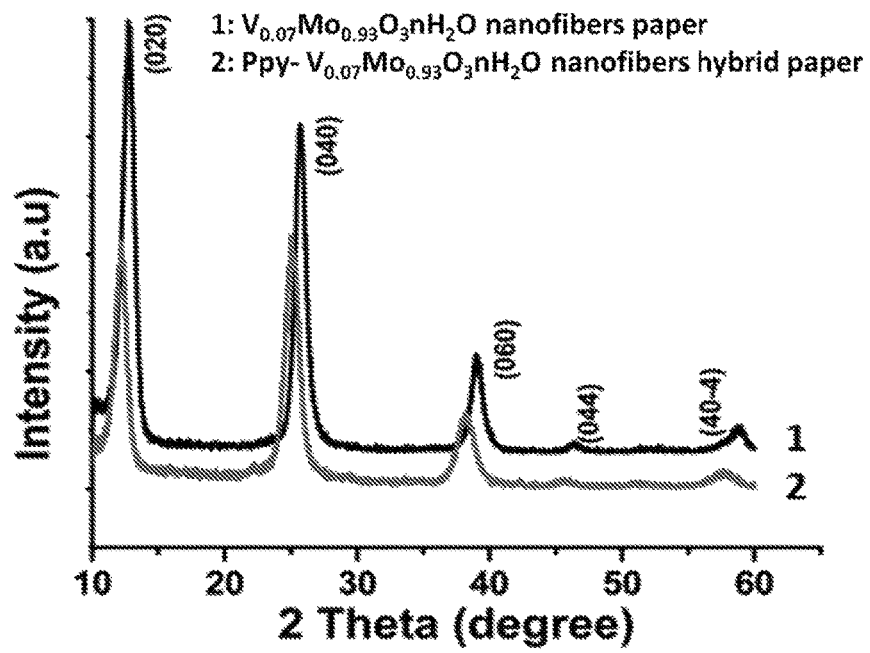
FIG. 2A depicts a X-ray diffraction (XRD) plot of the $V_{0.07}Mo_{0.93}O_3nH_2O$ nanofihers paper (VM NP) electrode and the Ppy-$V_{0.07}Mo_{0.93}O_3nH_2O$ nanofibers hybrid paper (Ppy-VM NHP) electrode, based on the present disclosure.
Figure 2B:
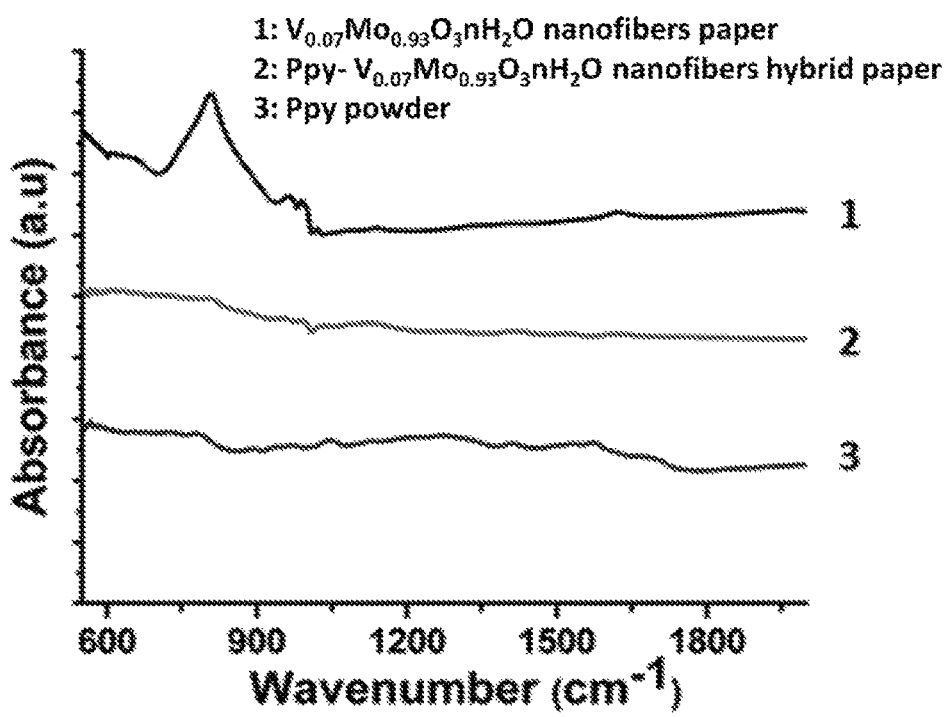
FIG. 2B depicts the Fourier transformation infrared (FTIR) spectra (in absorption mode) of the as-prepared free-standing flexible VM NP electrode, PPy-VM NHP electrode and Ppy powder based on the embodiments as disclosed herein.
Figure 2C:
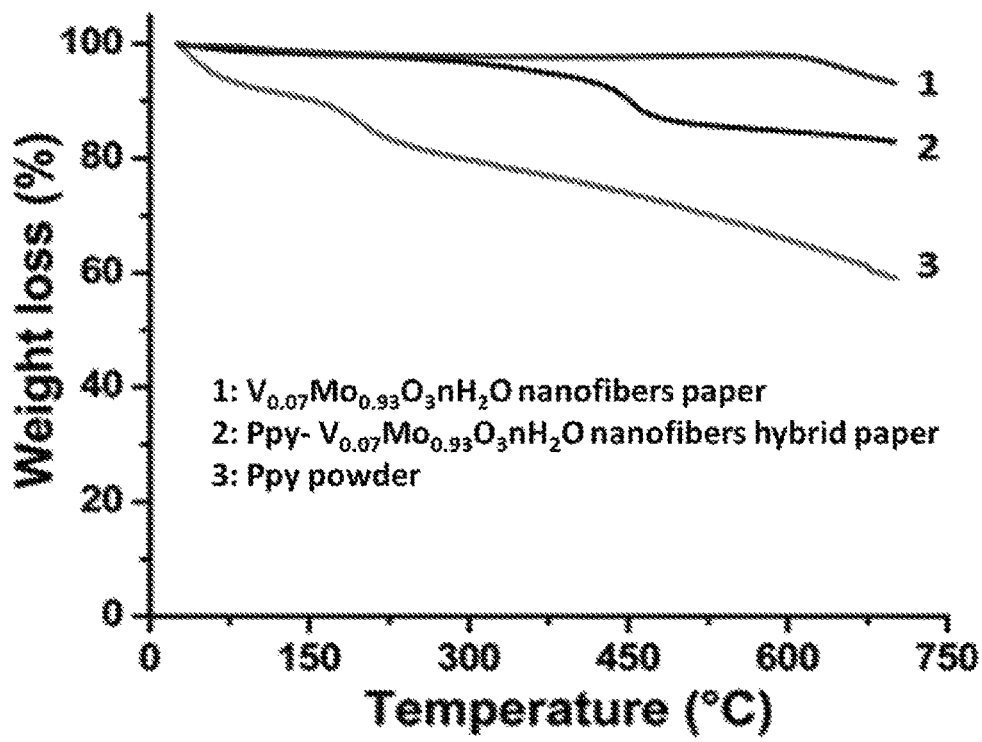
FIG. 2C depicts a thermogravimetric analysis (TGA) plot of the VM NP electrode, PPy-VM NHP electrode and Ppy powder based on the embodiments as disclosed herein.

The structural and elemental characterizations of the paper electrodes are presented in FIG. 2A to FIG. 2C. X-ray diffraction (XRD) analysis (FIG. 2A) of the prepared paper electrodes confirm the stable phase formation of the electrode materials which is characteristically layered. The Fourier transformation infrared (FTIR) spectroscopy analysis (FIG. 2B) shows the presence of vanadium and the effect of polymerization on the band position of $V_{0.07}Mo_{0.93}O_3nH_2O$. Thermogravimetric analysis (TGA) was also performed to evaluate the weight percentage of polypyrrole involved during the formation of polypyrrole-$V_{0.07}Mo_{0.93}O_3nH_2O$ nanofibers hybrid paper electrode (FIG. 2C). The weight percentage of polypyrrole in the polypyrrole-$V_{0.07}Mo_{0.93}O_3nH_2O$ nanofibers hybrid paper electrode is determined to be approximately 11 wt %. Hence, the present method and electrode require a lesser amount of conductive polymer compared to conventional approaches which needed at least 20 wt % of conductive additives.

Example 2: 10 wt % Vanadium Doped $MoO_3$ Nanofibers Paper ($V_{0.07}Mo_{0.93}O_3nH_2O$ Nanofibers Paper)

Figure 3A:
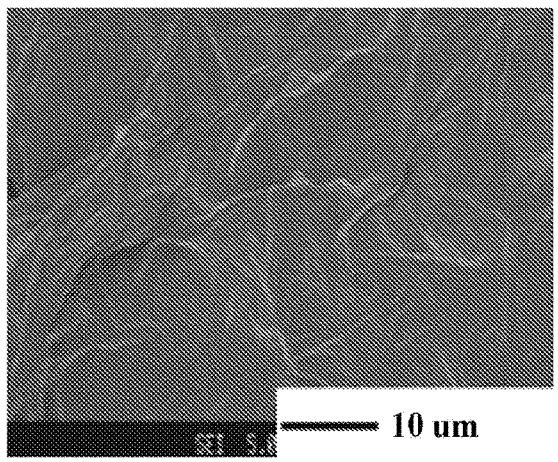
FIG. 3A shows a FESEM image of the VM NP electrode based on the present disclosure at a magnification of 2200×. The scale bar indicates 10 μm.
Figure 3B:
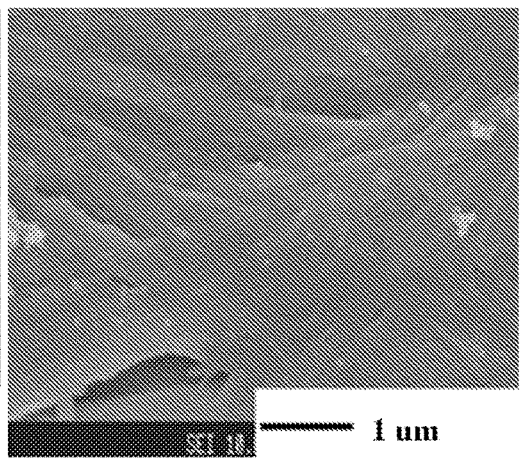
FIG. 3B shows a FESEM image of the PPy-VM NHP electrode made according to the present disclosure at a magnification of 19000×. The scale bar indicates 1 μm.
Figure 3C:
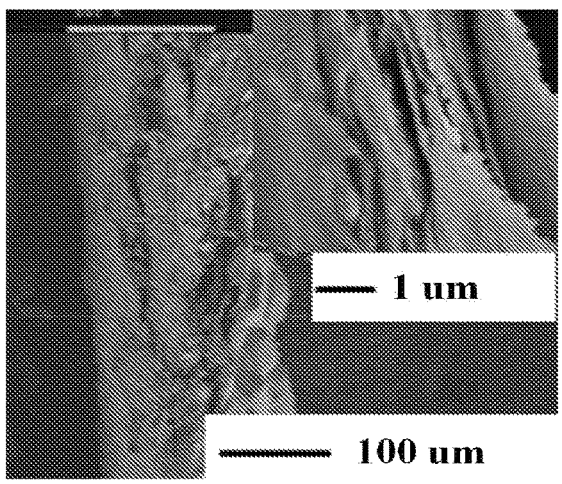
FIG. 3C shows a FESEM image of a cross-section of the VM NP electrode based on the present disclosure at a magnification of 250× and its further magnified view (as depicted in the upper right inset at a magnification of 9000×) which illustrates the densely packed layered arrangement of the two dimensional network of entangled nanofibers. The scale bars for the FESEM image and the inset indicate 100 and 1 μm, respectively.
Figure 3D:
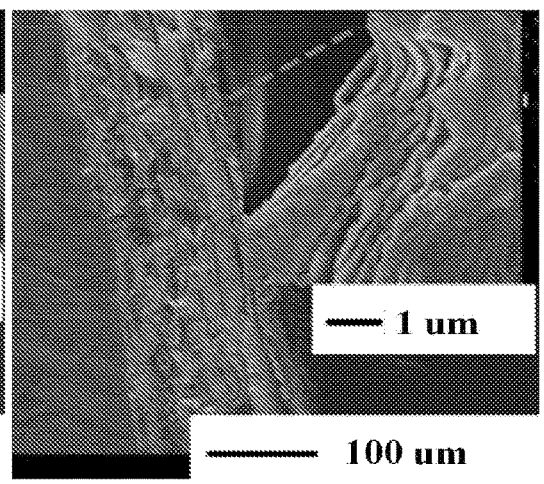
FIG. 3D shows a FESEM e of a cross-section of the Ppy-VM NHP electrode made according to the present disclosure at a magnification of 250× and its further magnified view (as depicted in the upper right inset at a magnification of 6500×) which illustrates the densely packed layered arrangement of the two dimensional network of entangled nanofibers. The scale bars for the FESEM image and the inset indicate 100 and 1 μm, respectively.

Lateral and cross-sectional views of the Field-emission scanning electron microscope (FESEM) micrographs of $V_{0.07}Mo_{0.93}O_3nH_2O$ nanofibers paper before and after provision of polypyrrole are shown in FIG. 3A to FIG. 3D. FIG. 3A shows the wrinkled and curved features associated with nanofibers paper. This is similar to the curved surface as obtained for conventional reduced graphene oxide free-standing paper. The presence of wrinkles or wavy features are desirable in order to promote the interaction of electrolyte ions with the surface of the electrode materials. The surface of the nanofibers paper was found to be unchanged even after polymerization of pyrrole monomers as shown in FIG. 3B. The cross-sectional FESEM analysis showed that the free-standing flexible paper electrode composed of $V_{0.07}Mo_{0.93}O_3nH_2O$ nanofibers encompassed layered structures of well separated two dimensional network of entangled nanofibers (see FIG. 3C). The sheets of nanofibers remain separated even after polymerization as observed in FIG. 3D.

The excellent separation of the nanofiber sheets is attributed to the strong intra-sheet nanofibers and weak inter-sheets nanofibers hydrogen bonding. The strong intra-sheet nanofibers hydrogen bonding can be ascribed to the existence of the hetero-complexes, i.e. per-oxo car peroxo molybdenum complex (a highly electronegative Mo centre) and per-oxo vanadium complex (less electronegative V centre). The conductivity of the polypyrrole $V_{0.07}Mo_{0.93}O_3nH_2O$ nanofibers hybrid paper (PPy-VM NHP) electrode was determined to be about $0.1\ S\ cm^{-1}$ using a four-probe technique. This indicates that the VM NP electrode has been effectively polymerized with poly-pyrrole.

Example 3: Mechanical Flexibility of Ppy-VM NHP

Figure 4:
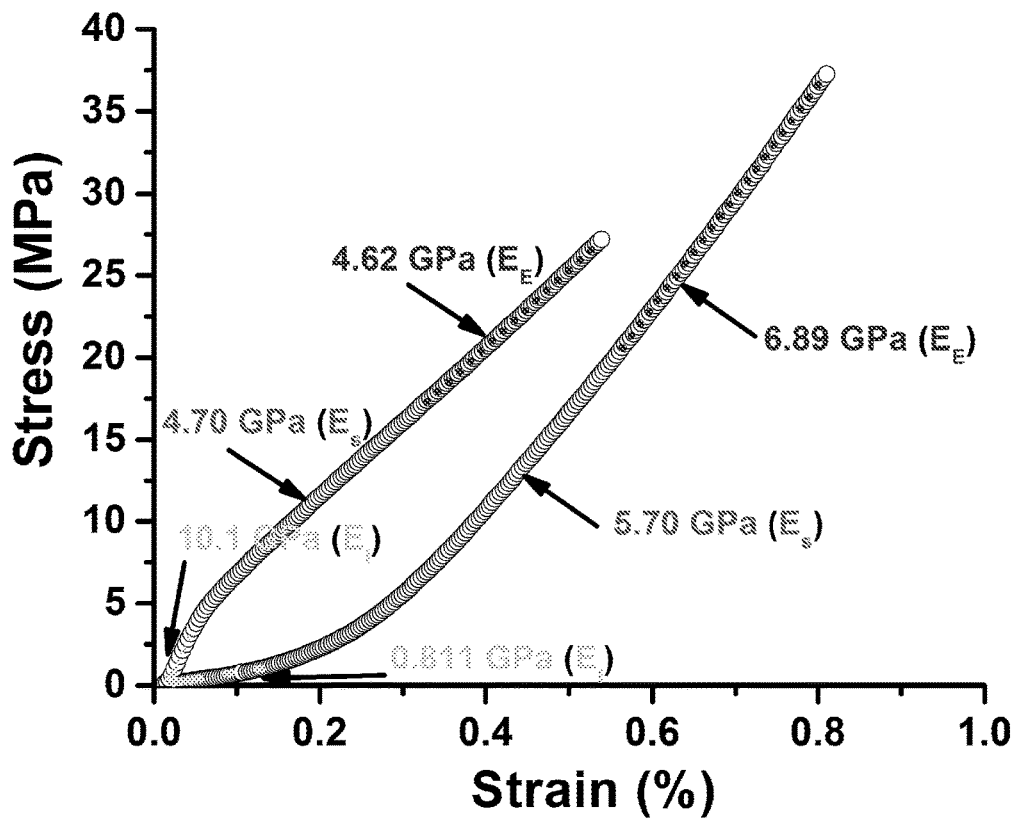
FIG. 4 shows a dynamical mechanical analyzer (DMA) test plot of the VM NP electrode and Ppy-VM NHP electrode based on the embodiments as disclosed herein.

To examine the mechanical properties of the Ppy-VM NHP electrode, dynamic mechanical analysis (DMA) was employed to analyze its Young's modulus and tensile strength as shown in FIG. 4. The behavior of the Ppy-VM NHP electrode under tensile stress is examined via stress/strain curves (also see FIG. 4). In the stress/strain curves, the mechanical response (stress/strain) of VM NP and Ppy-VM NHP electrodes can be divided into three segments, namely, the initial loading regime ($E_I$—region of bulk deformation, as represented by the dots at/near the start of the curves), the straightening regime ($E_S$—region of rearrangement, without any dots) and the linear elastic regime ($E_E$—region of disruption and deformation of bonds, as represented by the dots near/towards the end of the curves).

In the initial loading regime, the Young modulus of Ppy-VM NHP was found to be lower than VM NP, this indicates that during initial loading, the ease of deformation is associated with the displacement of polypyrrole on the nanofibers surface (elimination of bulk structural irregularities).

In the straightening regime ($E_s$), an increment of the Young modulus of Ppy-VM NHP was observed. This increment showed that the presence of polypyrrole chains on the surface of nanofibers reinforced the rearrangement of the nanofibers. Eventually, the Young modulus of the Ppy-VM NHP electrode showed further improvements in the linear elastic regime ($E_E$), which suggested that the incorporation of polypyrrole improves the interaction between $V_{0.07}Mo_{0.93}O_3 \cdot nH_2O$ nanofibers. A Young modulus of about 6.89 GPa was measured from the elastic region of the stress/strain curve with a tensile strength of up to 37.3 MPa being recorded. This is attributed to the layered structure of the two dimensional network of entangled nanofibers which is capable of exhibiting high mechanical strength in the lateral direction.

Figure 5A:
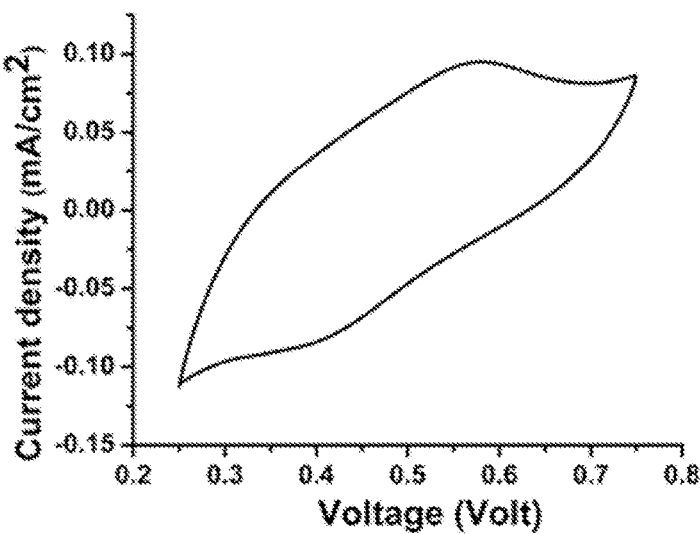
FIG. 5A shows a cyclic voltammogram of the Ppy-VM NHP electrode at a scan rate of 1 mV s$^{-1}$ based on the present disclosure.
Figure 5B:
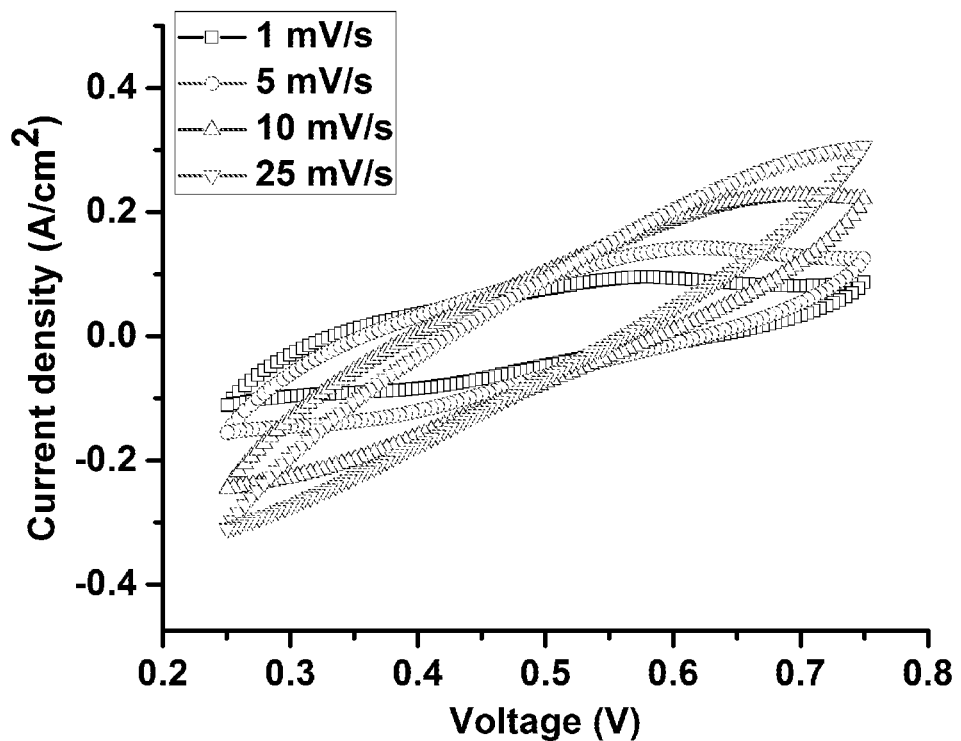
FIG. 5B shows the cyclic voltammograms of the Ppy-VM NHP electrode at various scan rates of 1 mV s$^{-1}$, 5 mV s$^{-1}$, 10 mV s$^{-1}$ and 25 mV s$^{-1}$ based on the present disclosure.

Example 4: Electrochemical Performance of Ppy-VM NHP as a Free-Standing Electrode in a Supercapacitor In order to evaluate the electrochemical performance of Ppy-VM NHP electrode, a three-electrode cell configuration was employed in which free-standing Ppy-VM NHP (directly attached to a metal clip) was used as the working electrode (about 4 mg) without e use of any metallic or other types of conductive current collector. Cyclic voltammograms (CVs) of the constructed Ppy-VM NHP electrode were carried out at various scan rates as shown in FIG. 5A and FIG. 5B. The observation of the redox peaks ($Mo^{6+}$ to $Mo^{5+}$) at a slow scan rate of 1 mV $s^{-1}$ signifies the pseudocapacitive behavior of the prepared free-standing flexible electrode material (see FIG. 5A).

Figure 5C:
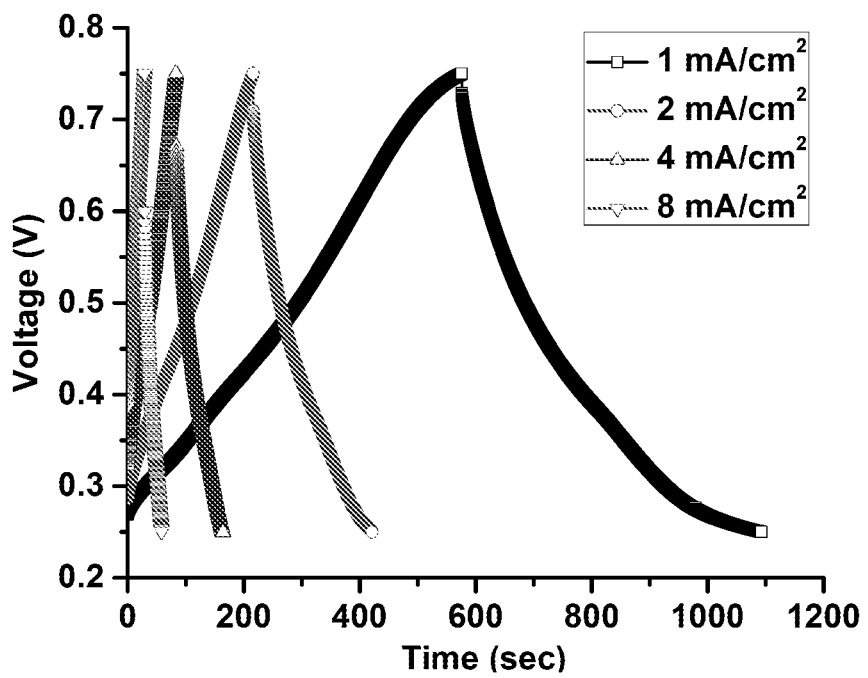
FIG. 5C shows the galvanic charge/discharge profiles of the Ppy-VM NHP electrode at various applied current densities of 1 mA cm$^{-2}$, 2 mA cm$^{-2}$, 4 mA cm$^{-2}$ and 8 mA cm$^{-2}$ based on the present disclosure.

The galvanic charge/discharge method was used to calculate the specific capacitance of the Ppy-VM NHP electrode at various applied current densities as shown in FIG. 5C. The areal capacitance (mF $cm^{-2}$) was calculated taking into consideration of the discharge time and the area of electrode immersed. The area of the electrode (about 1 $cm^2$) was kept fixed throughout the three-electrode tests. The free-standing flexible Ppy-VM NHP electrode achieved a high areal capacitance of 991 mF $cm^{-2}$ at an applied current density of 1 mA $cm^{-2}$.

Figure 5D:
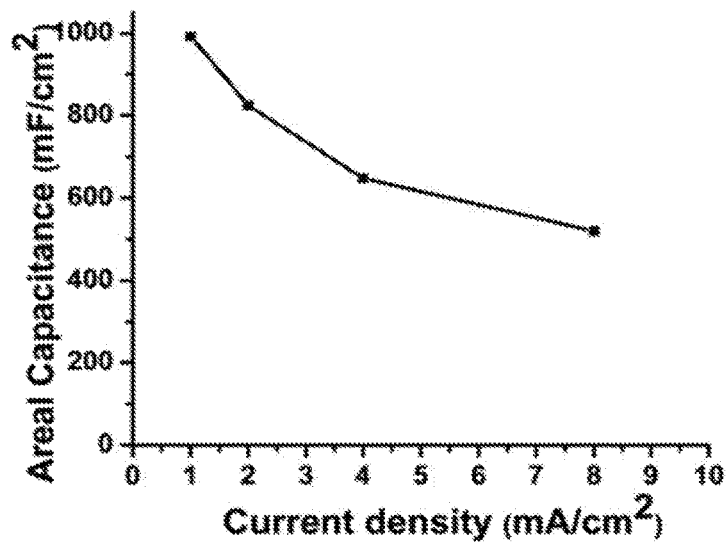
FIG. 5D shows a plot of the areal capacitance of the Ppy-VM NHP electrode made according to the present method as disclosed herein as a function of applied current density.

Accordingly, the capacitance achieved by the present electrode is higher than free-standing electrodes made from carbon based materials e.g. graphene-cellulose paper (81 mF $cm^{-2}$), graphene-$MnO_2$ nanostructure textile (94.5 mF $cm^{-2}$), carbon nanoparticles-$MnO_2$ nanorods (109 mF $cm^{-2}$), reduced-graphene oxide-$MnO_2$ composites (897 mF $cm^{-2}$), vanadium nitride-carbon nanotubes hybrid electrode (178 mF $cm^{-2}$), $WO_{3-x}/MoO_{3-x}$ core-shell nanostructures on carbon fabric (200 mF $cm^{-2}$), and 3D graphene-$MnO_2$ network (1420 mF $cm^{-2}$). The high areal capacitance could be attributed to the well exfoliated two dimensional network of the nanofibers which serves to provide better electrode to electrolyte contact as well as facile ions transport within the electrode. A comparison of the electrochemical performance of free-standing flexible supercapacitor devices is presented in table 1 below. The areal capacitance as a function of applied current density is presented in FIG. 5D.

TABLE 1

Comparison of Electrochemical Performance of Electrodes For Supercapacitors Applications

| Electrode system | Areal capacitance (mF $cm^{-2}$) | Applied current density (mA $cm^{-2}$) | Reference |
|---|---|---|---|
| $TiN/MnO_2$ on Ti foil | 41 | 0.12 | [26] |
| $PEDOT/MnO_2$ on Au coated alumina membrane | 62 | 5 | [27] |
| $SnO_2/MnO_2$ on Stainless steel | 64 | 0.08 | [28] |
| Hydrogenated $TiO_2/MnO_2$ on carbon cloth | 70 | 2 | [29] |
| $WO_{3-x}/Au/MnO_2$ on carbon fabric | 105 | 2 | [30] |
| Hydrogenated ZnO nanorods | 138.7 | 1 | [11] |
| Mesoporous Vanadium Nitride nanowires/CNT | 178 | 1.1 | [10] |
| $WO_{3-x}/MoO_{3-x}$ on carbon cloth | 500 | 5 | [12] |
| $MnO_2$/G-gel/NF | 1420 | 1 mV $s^{-1}$ | [9] |
| Ppy-VM NHP | 991 | 1 | Present electrode |

Example 5: Symmetric Flexible Supercapacitor Device Based on Ppy-VM NHP as Positive and Negative Electrodes In order to construct a symmetric supercapacitor device, two equal sized free-standing Ppy-VM NHP electrodes separated by the Advantec filter paper were used, in which 0.5 M $H_2SO_4$ served as the electrolyte. The volume and weight of the full cell were about 0.03 $cm^3$ (1 cm×3 cm×0.01 cm) and 20 mg, respectively, excluding the weight of the electrolyte and separator.

Figure 6A:
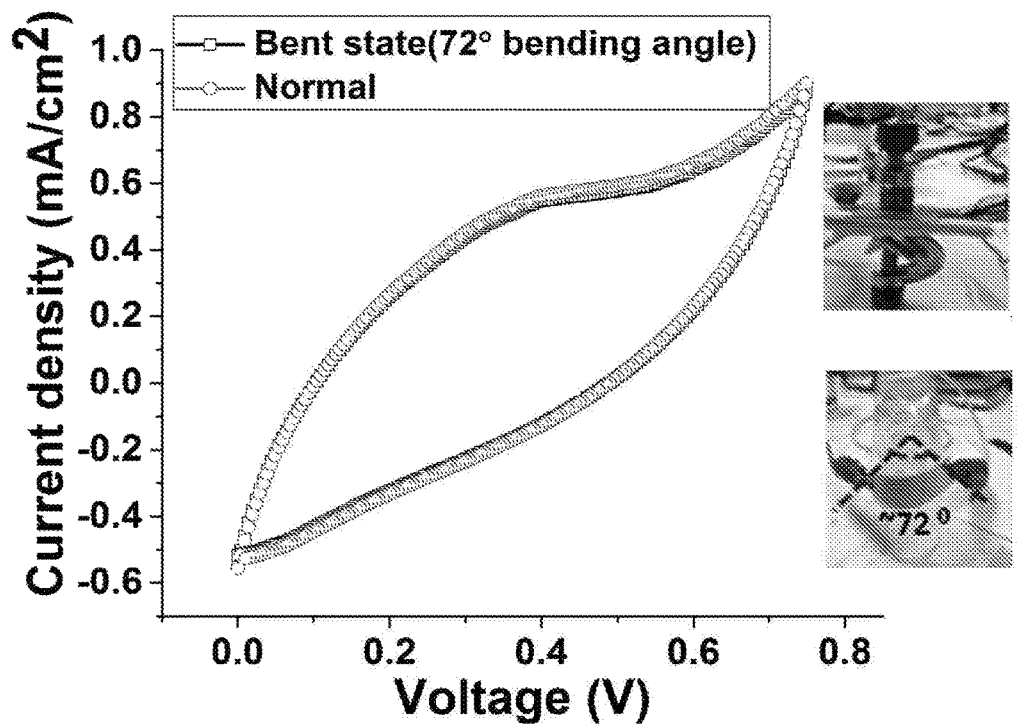
FIG. 6A shows a cyclic voltammogram of a symmetric supercapacitor made from the Ppy-VM NHP electrodes of the present disclosure in its bent state (72° angle) and normal state (also illustrated in the digital micrographs as shown in the bottom right and top right insets, respectively).
Figure 6B:
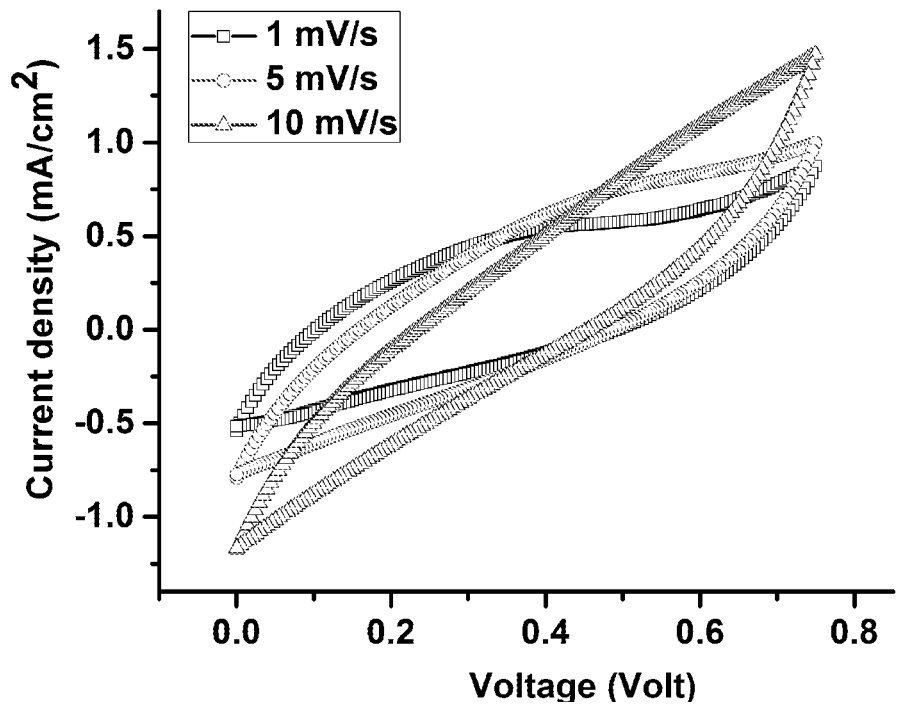
FIG. 6B shows the cyclic voltammograms of a symmetric supercapacitor (in its normal state) made from the Ppy-VM NHP electrodes of the present disclosure at various scan rates of 1 mV s$^{-1}$, 5 mV s$^{-1}$ and 10 mV s$^{-1}$.

To address the flexibility of the device, a symmetric supercapacitor device to having both positive and negative electrodes constructed from Ppy-VM NHP were prepared and tested in flat and bent conditions. CV curves of the symmetric device at various scan rates are shown in FIG. 6A and FIG. 6B within the potential window of 0 V to 0.75 V. CV curves (at 1 mV $s^{-1}$) of the symmetric; device in normal and bend conditions were found to be similar as depicted in FIG. 6A. This indicated that the Ppy-VM NHP electrodes are mechanically robust.

Figure 6C:
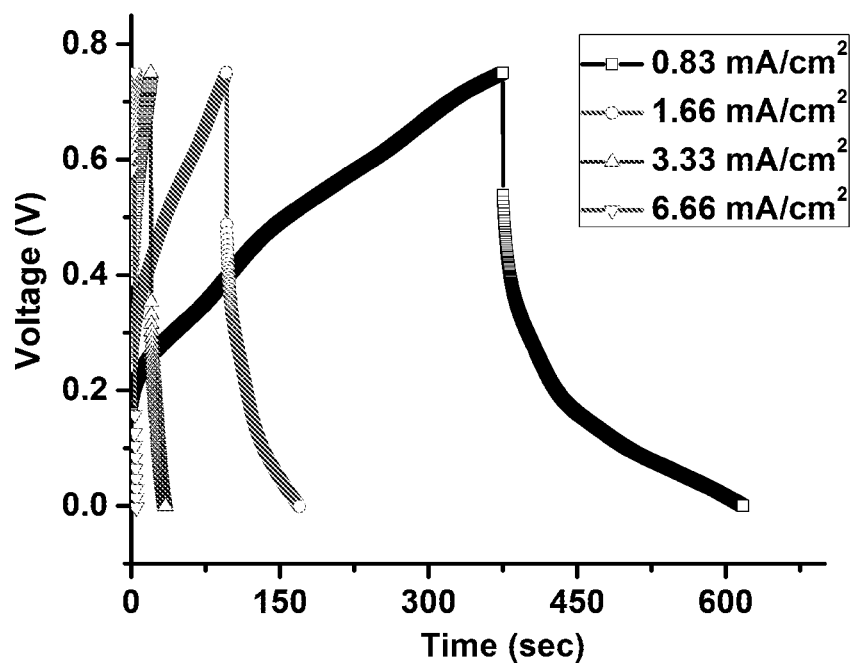
FIG. 6C shows the galvanic charge/discharge profiles of a symmetric supercapacitor (in its normal state) made from the Ppy-VM NHP electrodes of the present disclosure at various applied current densities of 0.83 mA cm$^{-2}$ 1.66 mA cm$^{-2}$, 3.33 mA cm$^{-2}$ and 6.66 mA cm$^{-2}$.

The charge/discharge curves of the symmetric device were derived at various current densities as shown in FIG. 6C. The charge/discharge profiles of the symmetric device were found to be non-linear. This indicated that the charge is stored by redox reactions rather than electric double layer capacitance (EDLC). The areal capacitance of the symmetric device at an applied current density of 0.83 mA cm$^{-2}$ was about 270 mF cm$^{-2}$.

Figure 6D:
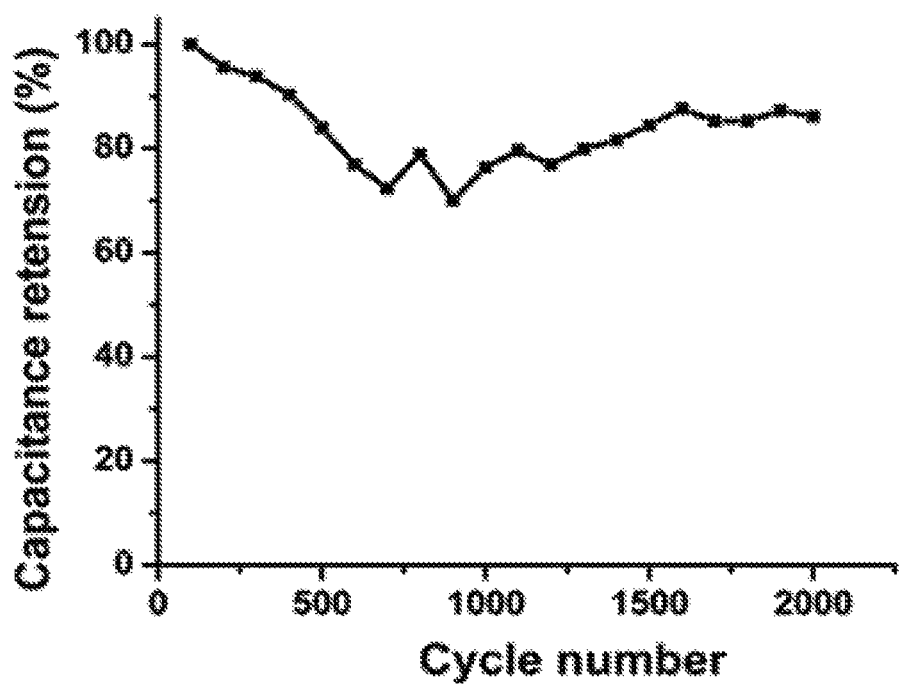
FIG. 6D shows the electrochemical cycling stability of a symmetric supercapacitor (in its normal state) made from the Ppy-VM NHP electrodes of the present disclosure, tested under continuous charge/discharge cycles at a scan rate of 50 mV s$^{-1}$.

In order to investigate the electrochemical stability of the symmetric device, the device is subjected to continuous charge/discharge CV test up to 2000 cycles. The cycling test was conducted at relatively higher scan rate (50 mV s$^{-1}$). A capacitance of about 86% was retained upon 2000 cycles without further degradation as shown in FIG. 6D. The initial degradation during the first 500 cycles could be attributed to the rearrangement of the nanofibers within the stacks. After rearrangement of the nanofibers, no further degradation in the capacitance was identified and this substantiated the excellent stability of Ppy-VM NHP electrodes in aqueous electrolytes.

Figure 6E:
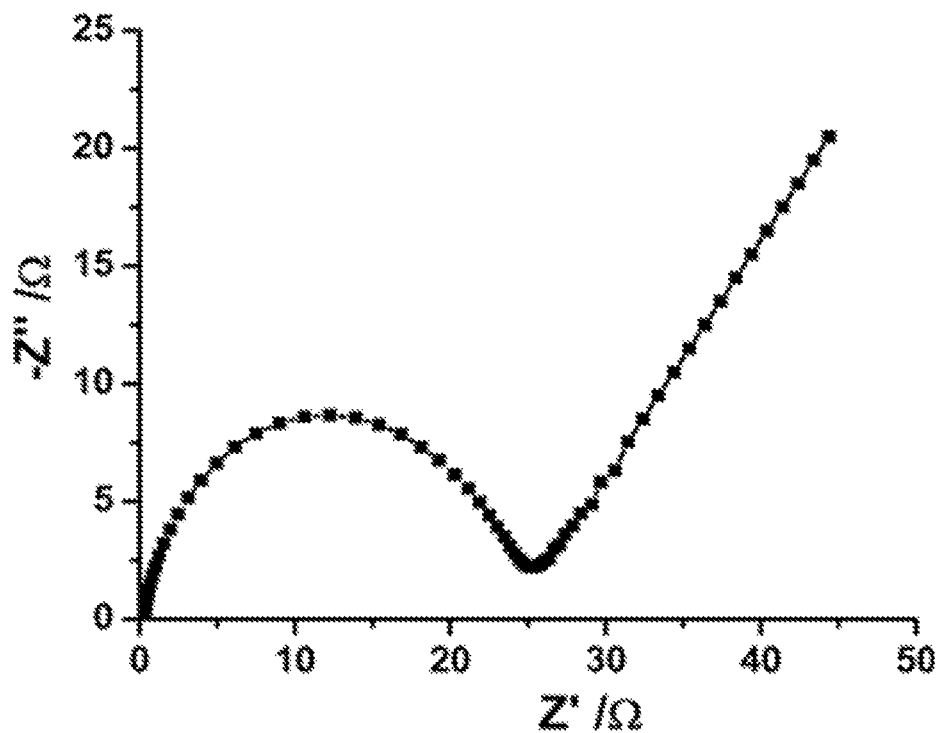
FIG. 6E shows a Nyquist plot of a symmetric supercapacitor its normal state) made from the Ppy-VM NHP electrodes of the present disclosure.
Figure 6F:
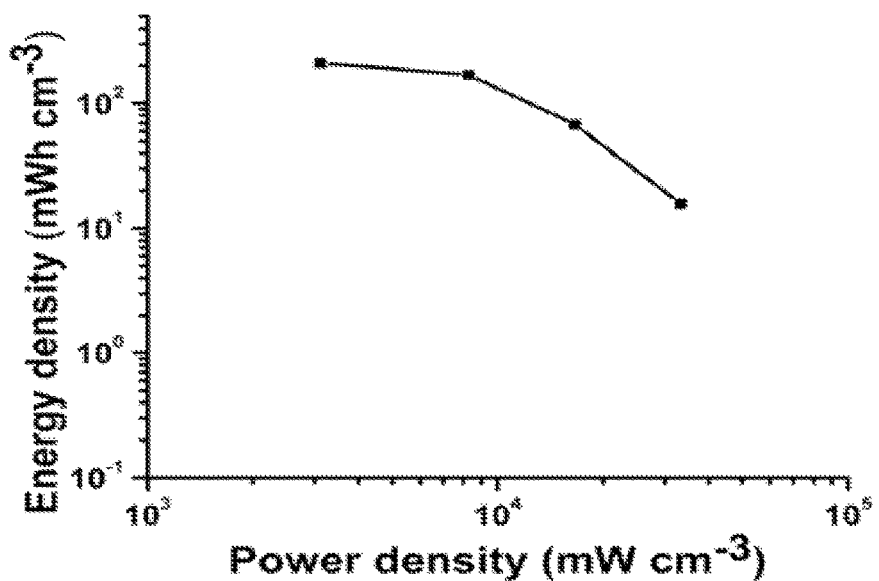
FIG. 6F shows a Ragone plot of a symmetric supercapacitor (in its normal state) made from the Ppy-VM NHP electrodes of the present disclosure.

Electrochemical impedance spectroscopy (EIS) of the symmetric device was performed in order to understand the relationship between the capacitive and resistive behavior of the device in the frequency range of 100 kHz to 100 MHz as shown in FIG. 6E. In the high frequency region (>10 kHz), the intercept at the X axis (real Z') indicates low (about 0.37 ohm) equivalent series resistance (ESR) of the device. The presence of a straight line (at 45° gradient) in the mid or low frequency region indicates the frequency dependent diffusion of the ions, which gives rise to the typical Warburg impedance. The observation of the Warburg element in the system is an indication of the diffusion controlled kinetics of the system. It is understood that a vertical line in the Nyquist plot (perpendicular to X-axis) indicates purely capacitive behavior while an inclined line is an indication of diffusion phenomenon. Diffusion resistance is an additional resistance which comes in series with the charge transfer resistance. Diffusion resistance arises due to slow transport of the ions within inter-layer region of the electrode material. The Ragone plot of areal energy and power density; of the present symmetric supercapacitor device is shown in FIG. 6F. Areal energy as high as 210 mWh cm$^{-3}$ (21 µWh cm$^{-2}$) can be achieved at low areal power of 3075 mW cm$^{-3}$ (307.5 µW cm$^{-2}$).

Example 6: Formation of Pan-VM NHP

Figure 7:
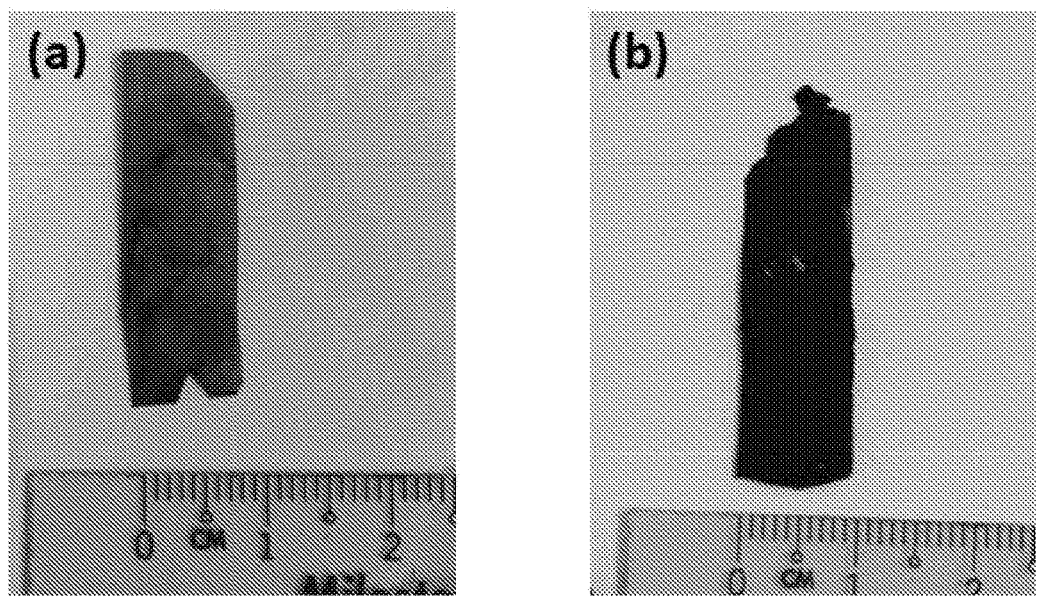
FIG. 7A shows a polymerized VM NHP obtained based on the present method as disclosed herein measured against a centimeter ruler, wherein the monomer used is aniline.
FIG. 7B shows a polymerized VM NHP obtained based on the present method as disclosed herein measured against a centimeter ruler, wherein the monomer used is pyrrole.

Using the same methods and conditions for producing Ppy-VM NHP as set out in examples 1 and 2, aniline monomers were used instead of pyrrole monomers to investigate the applicability of the present method for other conductive polymers. Based on FIG. 7A, it can be observed that the aniline coated on VM NHP was successfully polymerized to polyaniline. This shows that the present method can be used for other conductive polymers, such as polyaniline. Meanwhile, FIG. 7B shows a greater extent of polymerization when pyrrole monomers were used.

Example 7: Commercial Applications

The global market for materials and technologies in which the present method and electrode can be applied is provided below.

According to ID Tech Ex market survey reports, the global market for supercapacitors is $1.2 billion in 2014. Demand for supercapacitors is projected to continue growing at a very healthy rate during the next 4 years, reaching a value of $3.2 billion in 2018 at a compound annual growth rate (CAGR) of 50%. The portable electronics sector is projected to represent the largest segment in 2014 with total revenues of $540 million (equal to 45% of the total market). The present method and electrode can be used in supercapacitors or storage devices for electronics and hence would find utility in these sectors. The other sector in which the present method and electrode can be applied, for example, is the automotive industry. This sector is estimated to be 12% of the total market in 2014 and this sector is projected to increase at about 25% in 2018.

Hybrid and electric vehicles also require storage devices which may benefit from the present method and electrode. According to ID Tech Ex market research report, developers of advanced supercapacitors produce and sell hybrid electric storage (HES) devices composed of batteries, supercapacitors and control electronics. The blend of supercapacitors with lithium ion battery cells may enable longer life for the battery cells while reducing cost by as much as 40% for an equivalent size battery. If the present method and electrode are applied, the performance and cost of such battery cells may be further improved.

In the renewable energy sector, renewable energy storage technologies include, but not limited to, molten salt storage, compressed air storage, pumped hydropower, magnetic energy storage, flywheels and supercapacitors. According to a technical market research report from Navigant Research, the world market for renewable technologies was worth $11.3 billion in 2013 and may grow to $22.4 billion in 2020. The present method and electrode may be used to improve the performance of storage devices in the renewable energy sector, thereby contributing to further improvements in this sector.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

LIST OF REFERENCES

[1] C. Y. Foo, A. Sumboja, D. J. H. Tan, J. Wang, P. S. Lee, *Adv. Energy Mater.* 2014, 4, 1400236.
[2] A. Sumboja, C. Y. Foo, X. Wang, P. S. Lee, *Adv. Mater.* 2013, 25, 2809.
[3] X. Peng, L. Peng, C. Wu, Y. Xie, *Chem. Soc. Rev.* 2014, 43, 3303.
[4] W. Li, L. Zeng, Z. Yang, L. Gu, J. Wang, X. Liu, J. Cheng, Y. Yu, *Nanoscale* 2014, 6, 693.
[5] J. Che, P. Chen, M. B. Chan-Park, *J. Mater. Chem. A* 2013, 1, 4057.
[6] F. Liu, S. Song, D. Zhang, *Adv. Mater.* 2012, 24, 1089.
[7] Y. Wang, Z. Shi, Y. Huang, Y. Ma, C. Wang, M. Chen, Y. Chen, *J. Phys. Chem. C* 2009, 113, 13103.
[8] X. Yang, J. Zhu, L. Qiu, D. Li, *Adv. Mater.* 2011, 23, 2833.
[9] T. Zhai, F. Wang, M. Yu, S. Xie, C. Liang, C. F. Xiao, R. Tang, Q. Wu, X. Lu, Y. Tong, *Nanoscale* 2013, 5, 6790.
[10] X. Xiao, X. Peng, H. Jin, C. Zhang, B. Gao, B. Hu, K. Huo, J. Zhou, *Adv. Mater.* 2013, 25, 5091.
[11] P. Yang, X. Xiao, Y. Li, Y. Ding, P. Qiang, X. Tan, W. Mai, Z. Lin, W. Wu, T. Li, H. Jin, P. Liu, J. Thou, C. P. Wong, Z. L. Wang, *ACS Nano*, 2013, 2617.

[12] X. Xiao, T. Ding, L. Yuan, Y. Shen, Q. Zhang, X. Zhang, Y. Cao, B. Hu, T. Zhai, L. Gong, J. Chen, Y. Tong, J. Zhou, Z. L. Wang, *Adv. Energy Mater.* 2012, 2, 1328.
[13] Jiang, P. S. Lee, C. Li, *Energ. Environ. Sci.* 2013, 6, 41.
[14] Y. He, W. Chen, X. Li, Z. Zhang, J. Fu, C. Zhao, E. Xie, *ACS Nano*, 2013, 7, 174.
[15] Z. Burghard, A. Leineweber, P. A. van Aken, T. Dufaux, M. Burghard, J. Bill, *Adv. Mater.* 2013, 25, 2468.
[16] T. Tao, A. M. Glushenkov, C. Zhang, H. Zhang, D. Zhou, Z. Guo, H. K. Liu, Q. Chen, H. Hu Y. Chen, *J. Mater. Chem.* 2011, 21, 9350.
[17] K. Sakaushi, J. Thomas, S. Kaskel, J. Eckert, *Chem. Mater.* 2013, 25, 2557.
[18] L. Q. Mai, B. Hu, W. Chen, Y. Y. Qi, C. S. Lao, R. S. Yang, Y. Dai, Z. L. Wang, *Adv. Mater.* 2007, 19, 3712.
[19] N. A. Chernova, M. Roppolo, A. C. Dillon, M. S. Whittingham, *J. Mater. Chem.* 2009, 19, 2526.
[20] W. Sugimoto, T. Ohnuma, Y. Murakami, Y. Takasu, *Electrochem. Solid-State Lett.* 2001, 4, A145.
[21] J. Cao, J. Wu, *Mater. Sci. Eng. R: Rep.* 2011, 35.
[22] L. Noerochim, J. Z. Wang, D. Wexler, Z. Chao, H. K. Liu *J. Power Sources* 2013, 228, 198.
[23] B Krebs, *Acta Cryst. Sec. B* 972, 28, 2222.
[24] Z. Weng, Y. Su, D. W. Wang, F. Li, J. Du, H.-M. Cheng, *Adv. Energy Mater.* 2011, 1, 917.
[25] L. Yuan, X. H. Lu, X. Xiao, T. Zhai, J. Dai, F. Zhang, B. Hu, X. Wang, L. Gong, J. Chen, C. Hu, Y. Tong, J. Zhou, Z. L. Wang, *ACS Nano* 2012, 6, 656.
[26] S. Dong, X. Chen, L. Gu, X. Zhou, L. Li, Z. Liu, P. Han, H. Xu, J. Yao, H. Wang, X. Zhang, C. Shang, G. Cui, L. Chen, *Energy Environ. Sci.*, 2011, 4, 3502.
[27] R. Liu, J. Duay, S. B. Lee, *ACS Nano*, 2010, 4, 4299.
[28] J. Yan, E. Khoo, A. Sumboja, P. S. Lee, *ACS Nano*, 2010, 4, 4247.
[29] X. Lu, M. Yu, G. Wang, T. Zhai, S. Xie, Y. Ling, Y. Tong, Y. Li, *Adv. Mater.*, 2013, 25, 267.
[30] X. Lu, T. Zhai, X. Zhang, Y. Shen, L. Yuan, B. Hu, L. Gong, J. Chen, Y. Gao, J. Zhou, *Adv. Mater.* 2012, 24, 938.

The invention claimed is:
1. A method for synthesizing a free-standing flexible electrode, the method comprising:
   mixing a solution comprising molybdenum powder, vanadium powder and hydrogen peroxide to form a mixture comprising nanofibers represented by the formula of:

$V_{0.07}Mo_{0.93}O_3 \cdot nH_2O$ wherein n is 1 or 2;
   filtering the mixture to form an electrode comprising the nanofibers;
   treating the electrode with an acidic solution;
   contacting the acid-treated electrode with a monomer solution comprising monomers of a conductive polymer; and
   polymerizing the monomers in a medium comprising an oxidizing agent to form the conductive polymer.

2. The method of claim 1, wherein the molybdenum powder comprises about 85 to about 95 wt % of the mixed vanadium and molybdenum powders.
3. The method of claim 1, wherein the vanadium powder comprises about 5 to about 15 wt % of the mixed vanadium and molybdenum powders.
4. The method of claim 1, wherein the hydrogen peroxide comprises a concentration of about 10 to about 25 wt %.
5. The method of claim 1, further comprising heating the mixture to about 170 to about 190° C. to form the nanofibers.
6. The method of claim 1, wherein the mixture is filtered under vacuum and/or via a flow directed assembly.
7. The method of claim 1, wherein the filtered electrode is treated with the acidic solution for about 5 to about 10 hours.
8. The method of claim 1, further comprising drying the acid-treated electrode before contacting the acid-treated electrode with the monomer solution.
9. The method of claim 1, wherein the monomers comprise optionally substituted aniline or pyrrole units.
10. The method of claim 1, wherein the electrode contacted with the monomer solution is contacted with the medium for at least 10 mins.
11. The method of claim 1, wherein the electrode contacted with the monomer solution is contacted with the medium at 2 to 6° C.
12. The method of claim 1, wherein the medium comprises hydrochloric acid.
13. The method of claim 1, wherein the oxidizing agent comprises $FeCl_3 \cdot 6H_2O$ or ammonium persulfate.
14. The method of claim 1, further comprising washing and drying the electrode after forming the conductive polymer.
15. A free-standing flexible electrode comprising nanofibers comprising molybdenum, vanadium and a conductive polymer, wherein the electrode is represented by a formula of:

$X - V_{0.07}Mo_{0.93}O_3 \cdot nH_2O$ wherein X is the conductive polymer and n is 1 or 2.
16. The electrode of claim 15, wherein molybdenum is present in an amount of about 49.46 to about 55.29 wt %.
17. The electrode of claim 15, wherein the vanadium is present in an amount of about 2.43 to about 7.33 wt %.
18. The electrode of claim 15, wherein the conductive polymer comprises an optionally substituted polyaniline or polypyrrole.
19. The electrode of claim 15, wherein the conductive polymer is present in an amount of less than 20 wt %.
20. A storage device comprising an electrode comprising nanofibers comprising molybdenum, vanadium and a conductive polymer, wherein the electrode is represented by a formula of:

$X - V_{0.07}Mo_{0.93}O_3 \cdot nH_2O$ wherein X is the conductive polymer and n is 1 or 2.

* * * * *